United States Patent
Cho et al.

(10) Patent No.: US 12,120,105 B2
(45) Date of Patent: *Oct. 15, 2024

(54) METHOD AND ELECTRONIC DEVICE FOR MANAGING DIGITAL KEYS

(71) Applicant: Samsung Electronics Co., Ltd., Gyeonggi-do (KR)

(72) Inventors: Sungkyu Cho, Gyeonggi-do (KR); Jieun Keum, Gyeonggi-do (KR); Sehee Han, Gyeonggi-do (KR); Eunyoung Kwon, Gyeonggi-do (KR); Daehaeng Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,251

(22) Filed: Jan. 23, 2023

(65) Prior Publication Data
US 2023/0155996 A1 May 18, 2023

Related U.S. Application Data

(63) Continuation of application No. 17/113,969, filed on Dec. 7, 2020, now Pat. No. 11,563,730.

(30) Foreign Application Priority Data

Dec. 6, 2019 (KR) .................. 10-2019-0161837
Sep. 11, 2020 (KR) .................. 10-2020-0117043

(51) Int. Cl.
*H04L 9/40* (2022.01)

(52) U.S. Cl.
CPC ........ *H04L 63/0823* (2013.01); *H04L 63/045* (2013.01); *H04L 63/0876* (2013.01); *H04L 63/107* (2013.01); *H04L 63/20* (2013.01)

(58) Field of Classification Search
CPC .............. H04L 63/0823; H04L 63/045; H04L 63/0876; H04L 63/107; H04L 63/20;
(Continued)

(56) References Cited

U.S. PATENT DOCUMENTS 5,742,677 A 4/1998 Pinder
7,000,006 B1 2/2006 Chen
(Continued)

FOREIGN PATENT DOCUMENTS

CN 1276321 9/2006
CN 101729245 6/2010
(Continued)

OTHER PUBLICATIONS

International Search Report dated Mar. 5, 2021 in counterpart application No. PCT/KR2020/017591, 8 pages.
(Continued)

*Primary Examiner* — John B King
(74) *Attorney, Agent, or Firm* — The Farrell Law Firm, P.C.

(57) ABSTRACT

Provided is a method, performed by an electronic device, of managing keys for accessing a plurality of services. The method includes transmitting, by a secure domain (SD) in a secure area of the electronic device, a certificate of the SD to a plurality of service providers (SPs); receiving, by an application installed in the electronic device, a certificate of each of the plurality of SPs from the plurality of SPs; receiving, by the application, first signed data from a first SP among the plurality of SPs; authenticating, by the application, the first signed data by using a certificate of the first SP received from the first SP and obtaining an encrypted key of the first SP from the first signed data; decrypting, by the SD, the encrypted key of the first SP by using a private key of the SD; and storing the decrypted key of the first SP in a first
(Continued)

instance corresponding to the first SP among a plurality of instances of the SD.

12 Claims, 17 Drawing Sheets

(58) Field of Classification Search
CPC ............ H04L 63/1466; H04W 12/041; H04W 12/40; H04W 12/61; H04W 12/63; H04W 12/069; H04W 12/086
See application file for complete search history.

(56) References Cited

U.S. PATENT DOCUMENTS

| | | | |
|---|---|---|---|
| 8,532,301 B2 | 9/2013 | Ma et al. | |
| 9,503,433 B2 | 11/2016 | Nayshtut et al. | |
| 9,635,014 B2 | 4/2017 | Venkataraman et al. | |
| 9,853,977 B1 | 12/2017 | Laucius | |
| 2003/0079124 A1 | 4/2003 | Serebrennikov | |
| 2004/0003287 A1 | 1/2004 | Zissimopoulos | |
| 2005/0163079 A1 | 7/2005 | Taniuchi | |
| 2005/0229004 A1 | 10/2005 | Callaghan | |
| 2006/0026418 A1 | 2/2006 | Bade | |
| 2007/0183698 A1 | 8/2007 | Kim | |
| 2009/0103725 A1 | 4/2009 | Tang | |
| 2012/0174189 A1* | 7/2012 | Lim ................ H04L 63/067 726/26 |
| 2012/0297200 A1 | 11/2012 | Thom et al. | |
| 2013/0145140 A1 | 6/2013 | Hsien | |
| 2014/0047235 A1* | 2/2014 | Lessiak ............. H04W 12/35 713/164 |
| 2014/0153721 A1 | 6/2014 | Malone | |
| 2015/0178723 A1* | 6/2015 | Khan ............... H04W 12/35 726/6 |
| 2015/0234646 A1 | 8/2015 | Schafer | |
| 2015/0242851 A1 | 8/2015 | Wall et al. | |
| 2015/0324791 A1* | 11/2015 | Khan ............... H04W 12/086 705/44 |
| 2015/0381580 A1 | 12/2015 | Graham, III et al. | |
| 2016/0099923 A1 | 4/2016 | Golla | |
| 2016/0365984 A1 | 12/2016 | Lee et al. | |
| 2017/0019792 A1 | 1/2017 | Gargiulo | |
| 2017/0149827 A1* | 5/2017 | Sims .................. H04L 63/20 |
| 2017/0324717 A1 | 11/2017 | Kravitz et al. | |
| 2018/0007040 A1 | 1/2018 | Thom | |
| 2018/0089434 A1* | 3/2018 | Sibert ............ H04L 63/0853 |
| 2018/0139054 A1 | 5/2018 | Cha | |
| 2018/0162454 A1 | 5/2018 | Kwon et al. | |
| 2018/0219678 A1 | 8/2018 | Mevinsky | |
| 2019/0013937 A1* | 1/2019 | Leong ................ H04W 12/10 |
| 2019/0046339 A1 | 2/2019 | Gargiulo | |
| 2019/0108343 A1 | 4/2019 | Brandwine | |
| 2019/0158283 A1 | 5/2019 | Kang | |
| 2019/0334884 A1 | 10/2019 | Ross | |
| 2019/0357044 A1* | 11/2019 | Park ................ H04B 5/0031 |
| 2020/0235945 A1 | 7/2020 | Li et al. | |
| 2021/0203498 A1 | 7/2021 | Shin et al. | |
| 2021/0245705 A1* | 8/2021 | Reisinger ........... H04L 9/3236 |

FOREIGN PATENT DOCUMENTS

| | | | |
|---|---|---|---|
| CN | 101729493 | 6/2010 | |
| CN | 103493079 | 1/2014 | |
| CN | 104025507 | 9/2014 | |
| CN | 106031087 | 10/2016 | |
| CN | 107690771 | 2/2018 | |
| CN | 107766724 | 3/2018 | |
| CN | 108282466 | 7/2018 | |
| EP | 2 341 659 | 7/2011 | |
| EP | 3681046 A1 * | 7/2020 | ......... G01S 13/0209 |
| KR | 10-1660791 | 9/2016 | |
| KR | 10-2019-0108888 | 9/2019 | |
| WO | WO 2015/193578 | 12/2015 | |
| WO | WO 2017/181132 | 10/2017 | |
| WO | WO 2018/099606 | 6/2018 | |
| WO | WO 2018/231519 | 12/2018 | |
| WO | WO 2019/026038 | 2/2019 | |
| WO | WO 2019/051839 | 3/2019 | |
| WO | WO 2019/225921 | 11/2019 | |

OTHER PUBLICATIONS

Mohamed Sabt et al., Cryptanalysis of GlobalPlatform Secure Channel Protocols, Dec. 5, 2016.
GlobalPlatform Technology Card Specification Version 2.3.1, Mar. 2018.
GlobalPlatform Technology Confidential Card Content Management Card Specification v2.3 Amendment A Version 1.1.1, Sep. 2018.
European Search Report dated Nov. 30, 2022 in counterpart application No. 20896778.6-1218, 4 pages.
Liang Yu et al. "Strategy for and Implementation of Certificate Authority's Management of Certificates", China Academic Journal, Jun. 15, 2006, 5 pages.
Hui Li, "Security of Wireless Communication: DUXIU", Buptpress. com, Jun. 28, 2006, 5 pages.
Chinese Office Action dated Sep. 6, 2023 in counterpart application No. 202080082009.5, 14 pages.
European Search Report dated Sep. 22, 2023 in counterpart application No. 20896778.6-1218, 8 pages.
CN Notice of Allowance dated Feb. 1, 2024 in counterpart application No. 202080082009.5, 6 pages.
European Search Report dated Mar. 11, 2024 in counterpart application No. 23216092.9-1218, 4 pages.

* cited by examiner

METHOD AND ELECTRONIC DEVICE FOR MANAGING DIGITAL KEYS

CROSS-REFERENCE TO RELATED APPLICATIONS

This application is a Continuation Application of U.S. patent application Ser. No. 17/113,969, filed on Dec. 7, 2020, in the United States Patent and Trademark Office, which is based on and claims priority under 35 U.S.C. § 119 to Korean Patent Application No. 10-2019-0161837, filed on Dec. 6, 2019, in the Korean Intellectual Property Office, and Korean Patent Application No. 10-2020-0117043, filed on Sep. 11, 2020, in the Korean Intellectual Property Office, the disclosures of which are incorporated by reference herein in their entireties.

BACKGROUND

1. Field

The disclosure relates generally to an electronic device for performing ranging using an ultra-wide band (UWB) communication method and an operation method thereof.

2. Description of Related Art

The Internet is evolving from a human-centered connection network, one which humans generate and consume information, to an Internet-of-things (IoT) network, one which information is exchanged and processed between distributed components such as things. Internet-of-everything (IoE) technology is also emerging, in which big data processing technology is combined with IoT technology via a cloud server. To implement IoT, technical elements, such as sensing technology, wired/wireless communication and network infrastructures, service interface technology, and security technology, are required. In recent years, research has been conducted on technologies, such as a sensor network, machine-to-machine (M2M) communication, and machine type communication (MTC), for connection between things.

In an IoT environment, intelligent Internet technology (IT) services may be provided to collect and analyze data obtained from connected objects to generate new value. As existing information technology and various industries converge and are combined with each other, IoT is applicable to the fields of smart homes, smart buildings, smart cities, smart or connected cars, smart grids, health care, smart home appliances, and advanced medical services.

With the development of wireless communication systems, various services can be provided and thus, there is a demand for a method of effectively providing such services. For example, a ranging technique for measuring the distance between electronic devices through UWB may be used for medium access control (MAC). The UWB is a wireless communication technology that uses a very wide frequency band of several gigahertz (GHz) or more in a base band without using a radio carrier.

As personalized electronic devices such as smart phones and tablet personal computers (PCs) have come into widespread use, technologies for performing security and authentication using digital keys have been developed. As a digital key technology, a technology in which a digital key is integrated into a mobile device (e.g., a smart phone) using wireless communication technology such as near-field communication (NFC) has been developed. That is, a digitized virtual key (e.g., a digital key) may be inserted into a mobile device and a user of the mobile device may use the digital key, so that the user may replace a physical key with the digital key to open or close, control, and access a door.

As such, the use of digital keys will improve user convenience and industrial effects, however security concerns may persist. That is, a digital key basically needs to be integrated with an electronic device and, thus, is likely to be exposed to hacking of the electronic device. Accordingly, a technique for securely storing a digital key in an electronic device and accessing the digital key is needed.

There is a need for a method of managing digital keys, which are individually managed by businesses, in an integrated manner to improve interoperability and secure security.

SUMMARY

The present disclosure has been made to address the above-mentioned problems and disadvantages, and to provide at least the advantages described below.

According to an aspect of the disclosure, a method, performed by an electronic device, of managing keys for accessing a plurality of services. The method includes transmitting, by a secure domain (SD) in a secure area of the electronic device, a certificate of the SD to a plurality of service providers (SPs); receiving, by an application installed in the electronic device, a certificate of each of the plurality of SPs from the plurality of SPs; receiving, by the application, first signed data from a first SP among the plurality of SPs; authenticating, by the application, the first signed data by using a certificate of the first SP received from the first SP and obtaining an encrypted key of the first SP from the first signed data; decrypting, by the SD, the encrypted key of the first SP by using a private key of the SD; and storing the decrypted key of the first SP in a first instance corresponding to the first SP among a plurality of instances of the SD.

According to another aspect of the disclosure, an electronic device includes a secure area is configured to store keys for the electronic device to access a plurality of services; and a processor connected to the secure area, wherein a secure domain installed in the secure area transmits a certificate of the secure domain to a plurality of SPs, and wherein the processor is configured to control an application installed in the electronic device to receive a certificate of each of the plurality of SPs from the plurality of SPs; receive first signed data from a first SP among the plurality of SPs; and authenticate the first signed data by using a certificate of the first SP received from the first SP and obtain an encrypted key of the first SP from the first signed data, and wherein the secure domain installed in the secure area is further configured to decrypt the encrypted key of the first SP by using a private key of the secure domain, and store the decrypted key of the first SP in a first instance corresponding to the first SP among a plurality of instances of the secure domain.

According to another aspect of the disclosure, a non-transitory computer-readable recording medium storing a program for causing, when executed by an electronic device, the electronic device to perform a method of managing keys for accessing a plurality of services is provided. The method includes transmitting, by an SD in a secure area of the electronic device, a certificate of the SD to a plurality of SPs; receiving, by an application installed in the electronic device, a certificate of each of the plurality of SPs from the plurality of SPs; receiving, by the application, first signed data from a first SP among the plurality of SPs; authenticating, by the application, the first signed data by using a certificate of the first SP received from the first SP and obtaining an encrypted key of the first SP from the first signed data; decrypting, by the secure domain, the encrypted key of the first SP by using a private key of the SD; and storing the decrypted key of the first SP in a first instance corresponding to the first SP among a plurality of instances of the secure domain.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
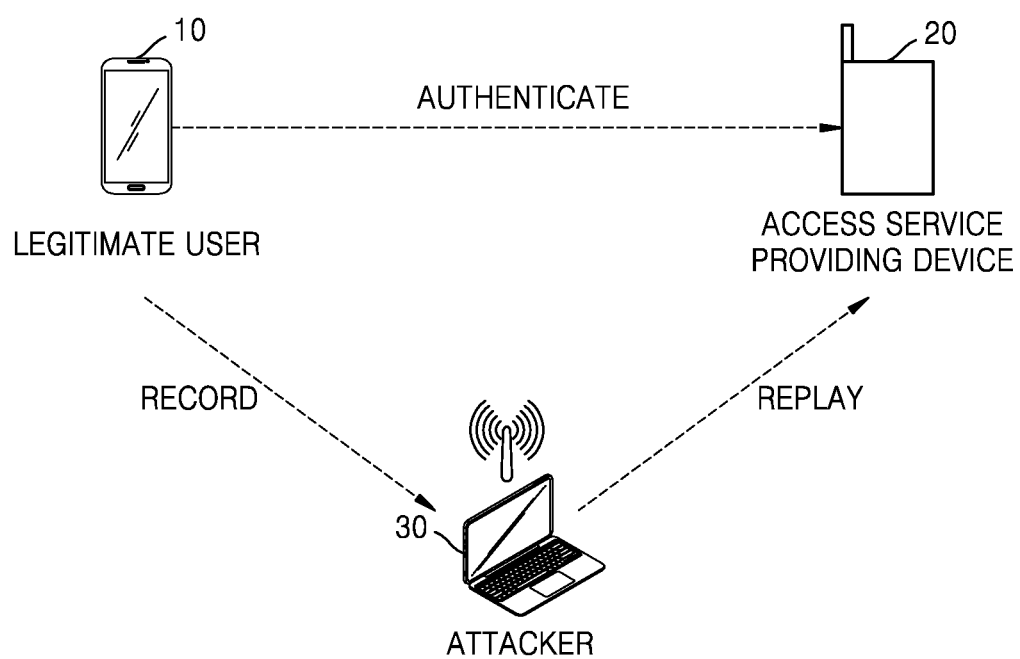
FIG. 1 illustrates a security threat that may occur when providing an access service, according to an embodiment.

Hereinafter, embodiments of the disclosure will be described in detail with reference to the accompanying drawings so that the embodiments of the disclosure may be easily implemented by those of ordinary skill in the art. However, the disclosure may be embodied in many different forms and is not limited to the embodiments of the disclosure set forth herein. With regard to description of drawings, similar components may be marked by similar reference numerals.

In the disclosure, general terms that have been widely used recently are selected in consideration of functions of the disclosure but various other terms may be selected according to the intentions of technicians in the art, precedents, or new technologies. Accordingly, the terms used herein should be defined based on the meanings thereof.

Terms such as first and second may be used to describe various components but the components should not be limited by the terms. These terms are merely used to distinguish one component from another.

The terms used herein are for the purpose of describing certain embodiments of the disclosure are not intended to be limiting of the disclosure. As used herein, the singular expressions are intended to include plural forms as well, unless the context clearly dictates otherwise. Throughout the specification, when an element is referred to as being "connected" to another element, it will be understood to include that the element is "directly connected" to the other element or is "electrically connected" to the other element with another element therebetween. It will be understood that when an element is referred to as "including" another element, the element may further include other elements unless mentioned otherwise.

Throughout the disclosure, the expression "at least one of a, b or c" indicates only a; only b; only c; both a and b; both a and c; both b and c; or all of a, b, and c.

Examples of a terminal may include a user equipment (UE), a mobile station. (MS), a cellular phone, a smartphone, a computer, or a multimedia system capable of performing a communication function.

In the disclosure, a controller may also be referred to as a processor.

Throughout the specification, a layer (or a layer apparatus) may also be referred to as an entity.

As used herein, "the" and similar referents may be used to indicate both singular and plural forms. When there is no description explicitly specifying an order of operations of a method according to the disclosure, the operations may be performed in an appropriate order. The disclosure is not limited to the order of the operations described.

As used herein, a "digital key" refers to a digitized virtual key and a user is able to control or access a device by using the digital key. The disclosure is directed to a method of managing a digital key, and the term "digital key" may be hereinafter referred to as a 'key'.

The expression "in one embodiment" appearing in various parts of the specification are not intended to refer to the same embodiment.

One embodiment of the disclosure may be represented by functional block configurations and various operations. Some or all of the functional blocks may be implemented by various numbers of hardware and/or software configurations for performing certain functions. The functional blocks of the disclosure may be implemented by one or more microprocessors or by circuit configurations for a certain function. The functional blocks of the disclosure may be implemented in various programming or scripting languages. The functional blocks may be implemented in an algorithm executed by one or more processors.

In addition, lines or members connecting elements illustrated in the drawings are merely illustrative of functional connections and/or physical or circuit connections. In an actual device, the connections between components may be represented by various functional connections, physical connections, or circuit connections that are replaceable or added.

In general, wireless sensor network technology is largely classified into wireless local area network (WLAN) technology and wireless personal area network (WPAN) technology according to a distance identified. In this case, WLAN is the Institute of Electrical and electronics Engineers (IEEE) 802.11-based technology for connection to a backbone network within a radius of 100 meters (m). WPAN is a technology based on IEEE 802.15, and examples thereof include Bluetooth™, ZigBee™, UWB.

A wireless network in which such wireless network technology is implemented may include a plurality of communication electronic devices. In this case, the plurality of communication electronic devices establish communication in an active period by using a single channel. That is, the plurality of communication electronic devices may collect and transmit packets in the active period.

UWB may refer to a short-range high-speed wireless communication technology using a wide frequency band of several GHz or more, a low spectral density, and a short pulse width (1 to 4 nanoseconds (nsec)) in a baseband state. UWB may be understood as a band to which UWB communication is applied. A ranging method performed between electronic devices will now be described based on a UWB communication method, but the UWB communication method is only an example and various wireless communication technologies may be used in practice.

Electronic devices may include a fixed UE embodied as a computer device or a mobile UE, and communicate with other devices and/or servers using a wireless or wired communication method. For example, the electronic devices may include, but are not limited to, a smart phone, a mobile terminal, a laptop computer, a digital broadcasting terminal, a personal digital assistant (PDA), a portable multimedia player (PMP), a navigation device, a slate PC, a tablet PC, a digital television (TV), a desktop computer, a refrigerator, a projector, a car, a smart car, and a printer.

Various embodiments of the disclosure relate to techniques for medium access control (MAC) based on device-to-device (D2D) communication.

D2D communication refers to a way in which geographically adjacent electronic devices communicate directly with each other without an infrastructure such as a base station. Electronic devices may communicate in a one-to-one manner, a one-to-many manner, or a many-to-many manner. In D2D communication, unlicensed frequency bands such as wireless fidelity (Wi-Fi) Direct and Bluetooth may be used. Alternatively, in D2D communication, licensed frequency bands may be used to improve frequency utilization efficiency of cellular systems. Although D2D communication is restrictively used to refer to M2M communication or machine intelligent communication, in the disclosure, D2D communication is intended to refer to not only communication between electronic devices having a communication function but also communication between various types of electronic devices having a communication function, such as smart phones or personal computers.

Various embodiments of the disclosure relate to MAC based on D2D communication described above, and the distance between electronic devices should be measured for MAC. In this case, UWB ranging technology may be used to measure the distance between electronic devices. For example, when a digital key stored in a smart phone is used to open or close a door of a vehicle, the vehicle may measure the distance between the smartphone and the vehicle by using UWB communication modules and estimate the location of the smart phone, based on a result of the measurement. The vehicle and the smart phone are capable of using multicast ranging or broadcast ranging.

FIG. 1 illustrates a security threat that may occur in providing an access service, according to an embodiment.

As illustrated in FIG. 1, a legitimate user 10 and an access service providing device 20 may perform authentication and ranging using D2D communication. In this case, when authentication is guaranteed according to a result value of the ranging performed by the legitimate user 10 and the access service providing device 20, there is a possibility of a security attack. An attacker 30 may record a signal transmitted from the legitimate user 10 and replay the recorded signal to the access service providing device 20 to attack a ranging process. The attacker 30 may obtain authority to access the access service providing device 20 by replaying the recorded signal, causing the access service providing device 20 to misidentify the attacker 30 as the legitimate user 10 being within a range in which the access authority is granted.

Accordingly, configuring a security protocol based on a pre-shared key may be required to reduce security threats that may occur in providing access services. According to the security protocol based on the pre-shared key, a ranging security level may be improved through exchange of encrypted data using the pre-shared key.

Each access service provider may have a unique symmetric key-based secure channel generation method to secure security. Thus, a security key used to generate a secure channel is considered a core asset that should not be shared with other entities (e.g., other access service providers, other businesses, or other servers).

To securely provide a mobile device-based access service, a mobile device stores important information (e.g., a key to be used to generate a secure channel) in a secure area therein (e.g., a secure element or a trusted execution environment (TEE)), The TEE may refer to a secure execution environment provided by a secure area in a processor in which a normal area and the secure area are separated. A secure area in which important information related to an access service is stored may be accessible only by an application of a provider providing the access service. Therefore, when a mobile device has to use a plurality of access services, it may be inconvenient to install an application for each access service in the mobile device.

A communication method using a secure channel is a method of allowing a mobile device to securely access an access service, and it is necessary to generate a fast and secure security session without exposing a key value for protecting a corresponding communication section to the outside.

For UWB secure ranging, major UWB parameters including a UWB session key may be exchanged through a Bluetooth-level secure channel. Because a key value to be used to generate a secure channel is classified as an important asset in providing an access service, some access service providers may have their own secure channel generation method.

Figure 2:
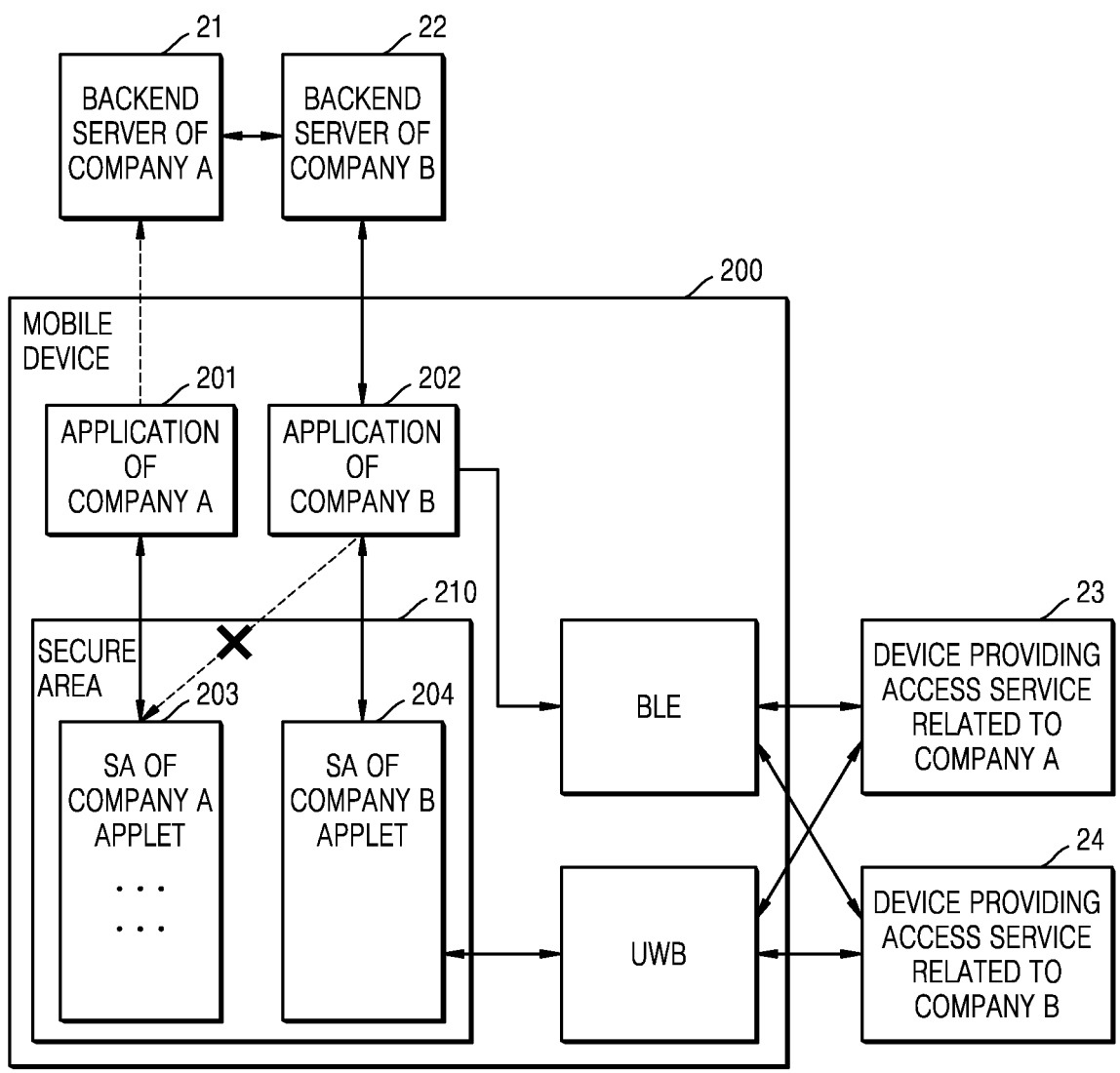
FIG. 2 illustrates a digital key management system in which a different key and a different secure area are used for each business, according to an embodiment.

FIG. 2 illustrates a general digital key management system in which a different key and a different secure area are used for each business, according to an embodiment.

Referring to FIG. 2, a backend server 21 of a company A may issue a key and store the key in a secure area 203 within a secure area 210 of a mobile device 200. In this case, only a dedicated application 201 provided by the company A may be accessible to the secure area 203, in which an applet (or a trusted application (TA)) provided by the company A is installed, to use the stored key.

The secure area 210 of the mobile device 200 may establish secure communication with a device 23 that provides an access service related to the company A by using the key stored in the secure area 203.

A backend server 22 of a company B may issue a key and store the key in a different secure area 204 within the secure area 210 of the mobile device 200. Only a dedicated application 202 provided by a company B may be accessible to the secure area 204, in which an applet (or a TA) provided by the company B is installed, to use the stored key.

The secure area 210 of the mobile device 200 may establish secure communication with a device 24 that provides an access service related to the company B by using the key stored in the secure area 204.

Because the company A and the company B manage different keys by using different secure areas, the dedicated application 202 of the company B is not accessible to the secure area 203 generated by the backend server 21 of the company A. Therefore, the company A and the company B may secure security by using different secure areas.

However, as illustrated in FIG. 2, when a key is managed using a different applet for each business, an application (or a framework) provided by a company is not accessible to a secure area related to a service provided by another company, thus lowering usability.

Figure 3:
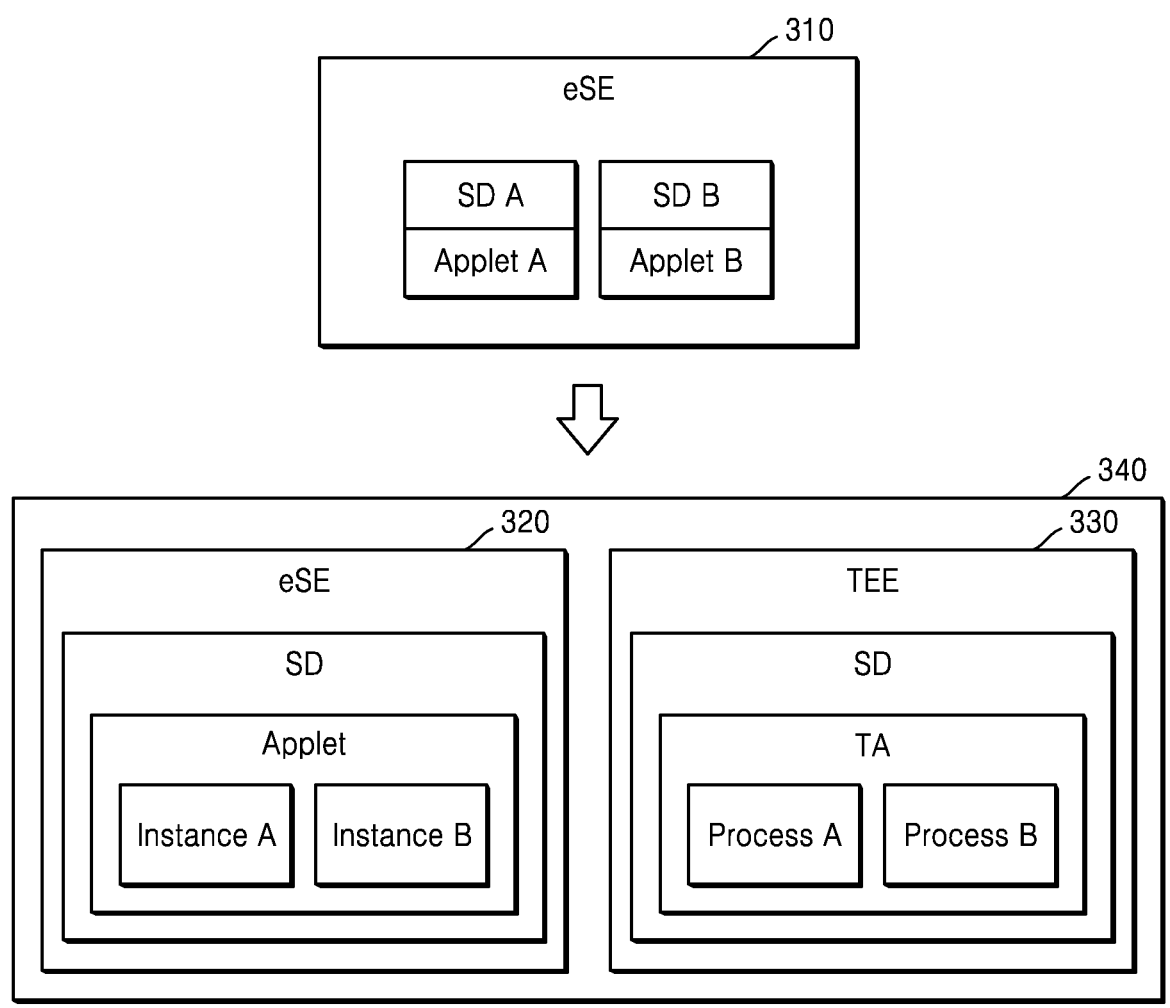
FIG. 3 is a diagram for explaining the difference between a general instance generation method and an instance generation method, according to an embodiment.

FIG. 3 is a diagram for explaining the difference between a general instance generation method and an instance generation method, according to an embodiment.

Referring to FIG. 3, as illustrated in a secure area 310, when service providers install applets thereof in different secure domains SD A and SD B, only one application is accessible to one secure domain. Therefore, because one application is not accessible to a key stored in an instance in another secure domain, it is impossible to access a plurality of access services through one application, thereby reducing compatibility.

On the other hand, security problems (e.g., a plaintext recovery attack) may occur when keys issued by service providers are stored in the same secure area to increase compatibility. When a malicious service provider's applet and an honest service provider's applet are stored in the same secure area, the malicious service provider may intercept the honest service provider's encrypted message to guess a secret query hidden in the encrypted message.

Therefore, in order to secure both compatibility and security, one embodiment of the disclosure provides a method of generating a plurality of instances based on the same code for one secure domain and storing and managing a key in a different secure area allocated to each of the instances.

A secure area 340 includes an embedded secure element (eSE) 320 and/or a TEE 330. In the eSE 320, a plurality of instances may be generated based on the same apple (or code) with respect to an applet installed in one secure domain, and keys may be stored and managed in different secure areas allocated to the plurality of instances. In the TEE 330, a plurality of processes may be generated based on the same TA (or code) with respect to a TA installed in one secure domain, and keys may be stored and managed in different secure areas allocated to the plurality of processes.

One embodiment of the disclosure includes a method of securely generating a secure channel by using a security key managed by each access service business and providing one application (or framework) to access the security key for each access service business, thereby increasing compatibility of key management. One embodiment of the disclosure includes a method of securely configuring a secure channel by providing a different secure area for each access service provider. One embodiment of the disclosure includes a method of securely performing UWB security ranging through a secure channel.

Figure 4A:
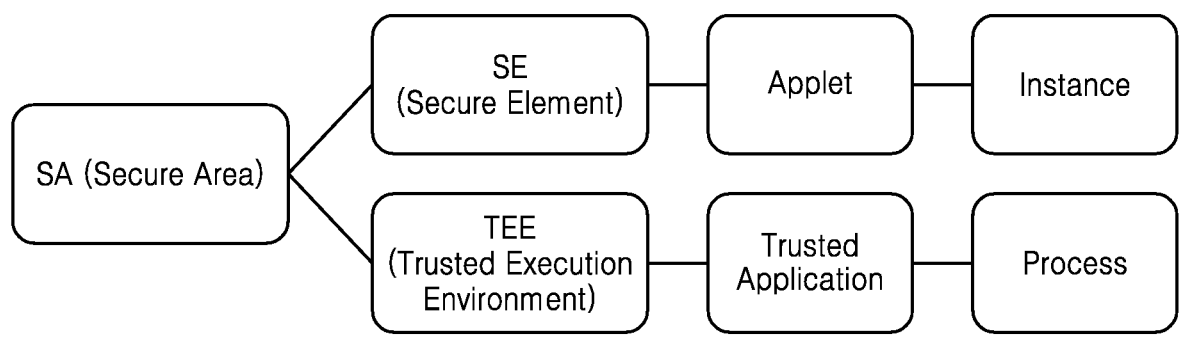
FIG. 4A illustrates a configuration of a secure area of a key management system, according to an embodiment.

FIG. 4A illustrates a configuration of a secure area of a key management system, according to an embodiment.

As illustrated in FIG. 4A, a secure area 430 is divided into an SE and a TEE according to a type thereof. In the SE, an applet may be installed and at least one instance may be generated in the applet to store a key. In the TEE, a TA may be installed and at least one process (or instance) may be generated in the TA to store a key.

As illustrated in FIG. 4A, the SE and the TEE may be secure areas having different characteristics but having the same structure. A case in which an electronic device includes an SE as a secure area will now be described. However, the disclosure is not limited to an embodiment in which a key is managed by the SE and is also applicable to a case in which a key is managed by a TA installed in a TEE. Accordingly, in the following description, operations performed by the SE and an applet of the SE may be performed by the TEE and TA, and redundant descriptions are omitted.

Figure 4B:
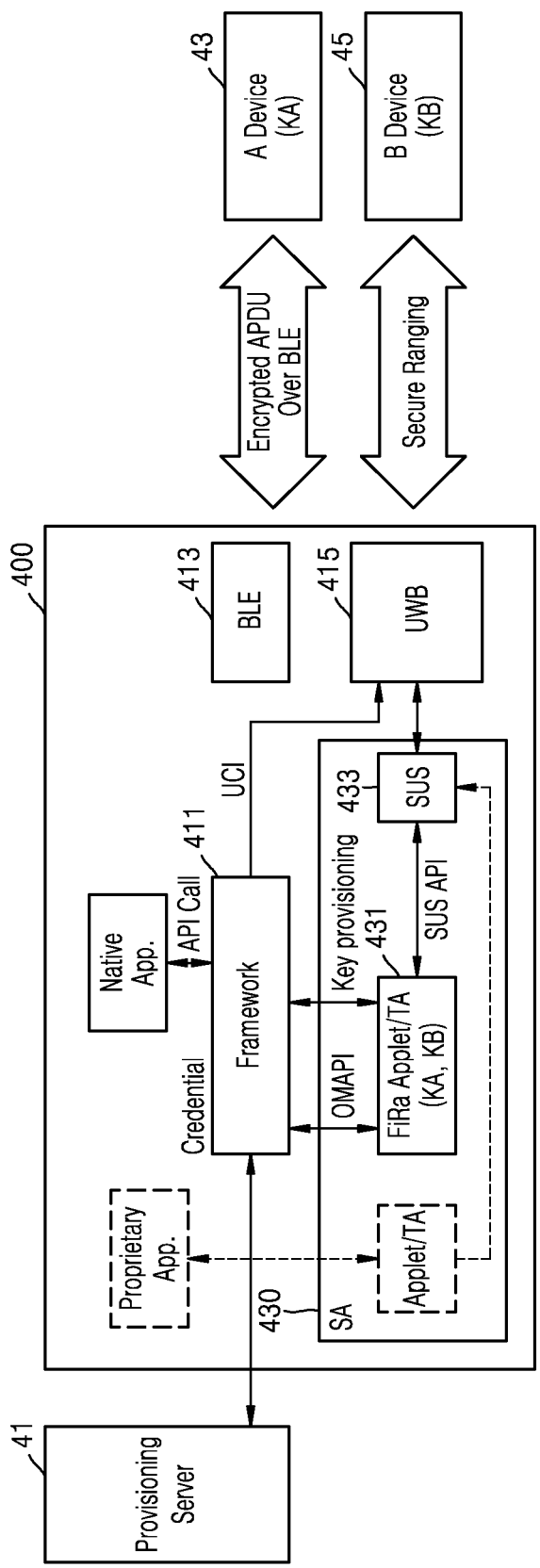
FIG. 4B illustrates a configuration of a key management system according, to an embodiment.

FIG. 4B illustrates a configuration of a key management system, according to an embodiment.

Referring to FIG. 4B, a service providing server 41 included in a key management system may install a secure domain in a secure area 430 through a framework 411, and allocate an instance to each business, based on a common applet (or TA) 431 to internally separate secure areas from each other. The framework 411 may access secure areas allocated to a common applet (or TA) 431. Each business may use a separate secure area by individually storing important information (e.g., a key for a secure channel) in a secure area allocated to an instance.

The framework 411 refers to a software environment and/or a hardware environment that provides available functions of a mobile application in the form of an application programming interface (API). The framework 411 may be a system development kit (SDK) or an application installed in an Android™ system. The framework 411 may be an application that provides a digital key management service. The framework 411 may provide an API accessible by an external entity (e.g., a provision server, a backend server of a certain company, or a service provider server), and provide functions such as access control and command conversion to access the secure area 430.

In the secure area 430 of an electronic device 400, a common applet (or TA) suggested by the FiRa Consortium may be installed for digital key management. The instance may refer to a program in which an applet is installed and registered by the secure domain and is actually operated. When the applet is actually registered and installed in a registry and is operated, the applet may be referred to as an instance. In general, one instance is loaded for one applet, but in the disclosure, a plurality of keys may be securely managed by allocating a plurality of instances to a common applet.

A secure domain refers to an application installed in a secure area to control, manage, and secure an applet. The electronic device 400 may perform secure communication and security ranging with each of access service providing devices 43 and 45, based on important information stored for each instance. The access service providing devices 43 and 45 may be actual UEs (e.g., a door lock) which provide a physical access service. The electronic device 400 may perform secure communication with one of the access service providing devices 43 and 45 by using a Bluetooth™ communication module 413, and perform security ranging with one of the access service providing devices 43 and 45 by using a UWB communication module 415. When the electronic device 400 performs security ranging, a secure UWB Service (SUS) applet 433 may support encrypted communication between the UWB module 415 and the secure area 430.

Figure 5:
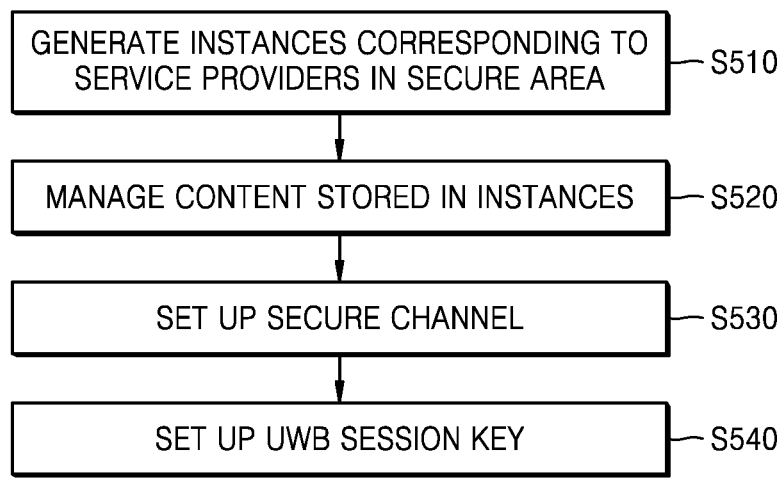
FIG. 5 is a flowchart of an operation method of a key management system, according to an embodiment.

FIG. 5 is a flowchart of an operation method of a key management system, according to an embodiment.

Referring to FIG. 5, in step S510, a secure area issuer installs a secure domain in a secure area of an electronic device and generates a plurality of instances corresponding to a plurality of SPs. The secure area issuer may include, for example, a TEE administrator and/or a secure element issuer (SEI).

An SP is a subject that uses an applet installed in the secure area of the electronic device and may refer to a backend server of a company that provides an access service. The SP may be a server of an application provider that provides an application installed in the electronic device to provide an access service to the electronic device.

In step S520, each of the plurality of SPs manages content stored in the instance corresponding thereto. The content stored in the corresponding instance may include, for example, a security key issued by the SP. A key issued by each SP may be stored in one of a plurality of instances allocated in a common applet installed in a secure area.

In step S530, a secure channel is set up between an applet installed in the secure area of the electronic device and an access service providing device. The electronic device may perform mutual authentication between an instance and an access service providing device by using a key stored in the instance and set up a Bluetooth™-level secure channel.

In step S540, a UWB session key is set up between an instance in the secure area of the electronic device and an access service providing device. The UWB session key may be generated using the secure channel generated in step S530. An embodiment related to the generation of the UWB session key will be described in detail with reference to FIGS. 7 and 8 below.

A method performed by an electronic device of managing keys for accessing a plurality of services will be described in detail with reference to FIG. 6 below.

Figure 6:
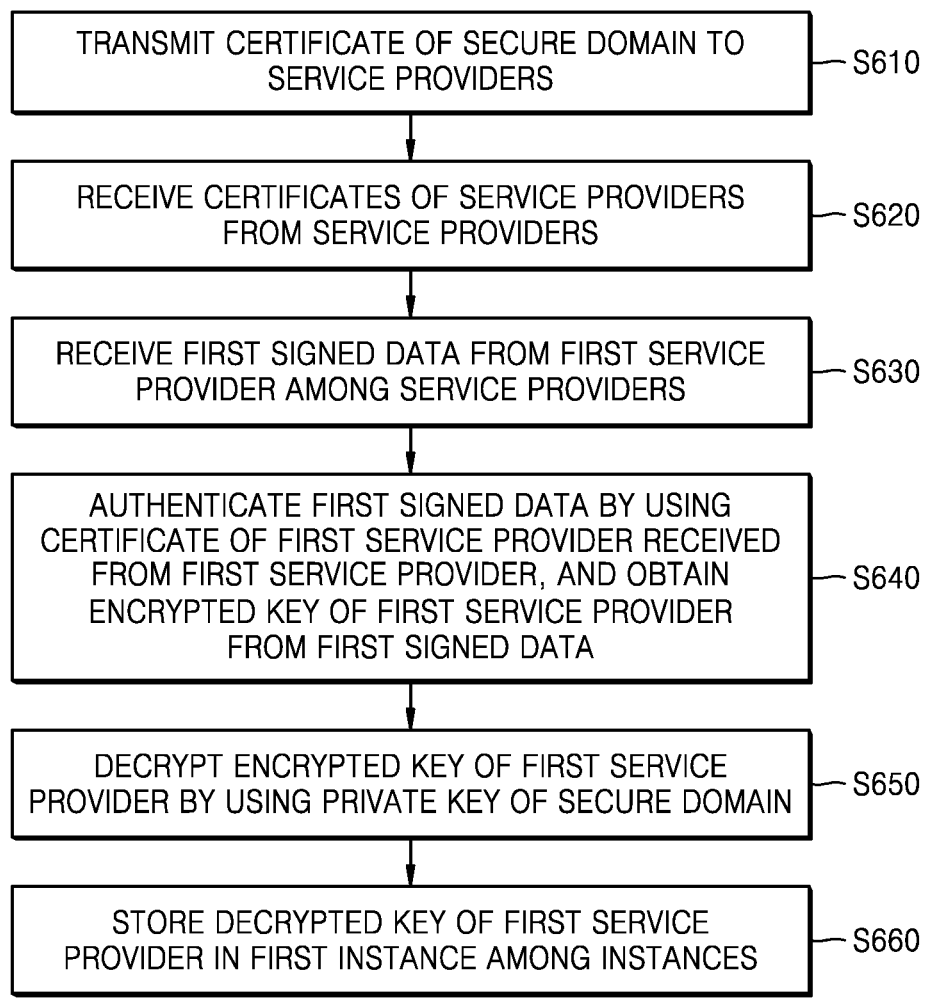
FIG. 6 is a flowchart of a method of managing keys by an electronic device, according to an embodiment.

Referring to FIG. 6, in step S610, a secure domain installed in a secure area of the electronic device 400 transmits a certificate of the secure domain to a plurality of SPs.

Before the secure domain transmits the certificate thereof, a framework installed in the electronic device 400 may install a secure domain in the secure area. The framework may generate the secure domain in the secure area, based on information received from a secure area issuer. The framework may instantiate the secure domain to generate a plurality of instances. The plurality of instances may correspond to the plurality of SPs. A method of generating an instance will be described in detail with reference to FIG. 9 below.

The electronic device 400 may transmit a certificate including a public key of the secure domain to the plurality of SPs.

In step S620, the framework installed in the electronic device 400 receives certificates of the plurality of SPs from the plurality of SPs.

The electronic device 400 may receive a certificate including a public key of each of the plurality of SPs from each of the plurality of SPs.

In step S630, the framework installed in the electronic device 400 receives first signed data from a first SP among the plurality of SPs.

The first signed data received from the first SP may include a first SP key, which is encrypted using the public key of the secure domain, and a signature using a private key of the first SP. The first SP may encrypt the first SP key using the public key of the secure domain stored in advance, and sign the encrypted first SP key by using the private key of the first SP. The first SP key may be a symmetric key for the first SP to use to provide an access service through a secure channel.

In step S640, the framework installed in the electronic device 400 authenticates the first signed data by using a first SP certificate received from the first SP, and obtains the encrypted first SP key from the first signed data.

The framework may authenticate the first signed data by using the public key of the first SP, and obtain the encrypted first SP key from the authenticated first signed data.

In step S650, the secure domain in the secure area of the electronic device 400 receives the encrypted first SP key from the framework and decrypt the encrypted first SP key by using a private key of the secure domain.

In step S660, the secure domain in the secure area of the electronic device 400 stores the decrypted first SP key in a secure area allocated to a first instance corresponding to the first SP among a plurality of instances of the secure domain.

The electronic device 400 may generate an instance for each of the plurality of SPs and store a key of each of the plurality of SPs to the instance corresponding thereto. Each of the plurality of SPs may securely manage the key by providing the key to the corresponding instance of the electronic device.

The framework may receive second signed data from a second SP among the plurality of SPs. The framework may authenticate the second signed data by using a second SP certificate received from the second SP and obtain an encrypted second SP key from the second signed data. The secure domain may receive the encrypted second SP key from the framework and decrypt the encrypted second SP key by using the private key of the secure domain. The secure domain may store the decrypted second SP key in a secure area allocated to a second instance corresponding to the second SP among the plurality of instances of the secure domain.

As described above, a key management system may secure security by securing a separate secure area within a secure area of an electronic device by allocating an instance to each SP.

Accordingly, the electronic device 400 may perform mutual authentication between a first device, which provides an access service related to the first SP, and the first instance, and set up a secure channel by using the first SP key stored in the first instance. For example, the electronic device 400 and the first device may set up a secure channel by using a Bluetooth™ communication method.

The first instance of the electronic device 400 may generate a session key using the first SP key and exchange the session key with the first device through the secure channel. In addition, the first instance of the electronic device 400 may exchange a UWB parameter together with the session key through a Bluetooth™ secure channel.

The electronic device 400 may increase a security level of UWB ranging by using the session key as an input value for generating a UWB session key. For example, the electronic device 400 may directly generate the UWB session key by using the session key generated using the first SP key. Additionally or alternatively, the electronic device 400 may receive a UWB session key generated by the first device, based on a session key generated using the first SP key.

The electronic device 400 may perform ranging by transmitting or receiving a ranging frame including code of a scrambled timestamp sequence (STS) generated using the UWB session key. The electronic device 400 may transmit or receive a ranging frame by using a UWB communication method.

The STS is a cipher sequence known only to two electronic devices participating in ranging. Each of the two electronic devices may calculate the STS from the UWB session key by using a deterministic random bit generator (DRBG). When an electronic device acting as a transmitter transmits a ranging frame including an STS, an electronic device acting as a receiver may verify whether the received STS and a calculated STS are the same value. When it is verified that the received. STS and the calculated STS are the same value, the electronic device acting as the receiver may trust the received information and perform secure ranging by using this information therefor.

Figure 7:
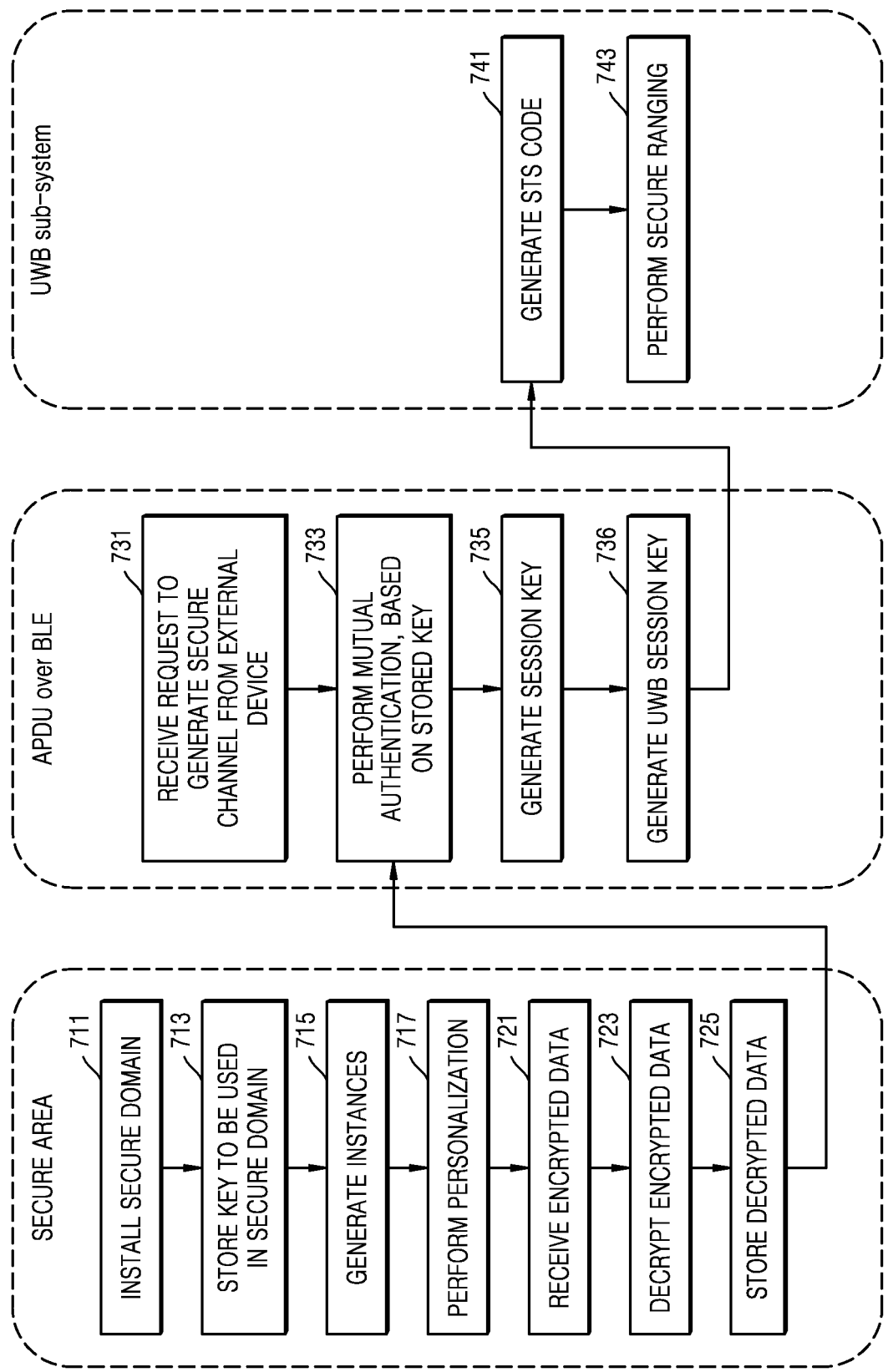
FIG. 7 is a detailed flowchart of an operation method of an electronic device, according to an embodiment.

FIG. 7 is a detailed flowchart of an operation method of an electronic device, according to an embodiment.

Referring to FIG. 7, in step 711, a secure domain is installed in a secure area of the electronic device 400 by a secure area issuer. In step 713, a framework of the electronic device 400 receives a key to be used in the secure domain from the secure area issuer and store the key in the secure domain. In step 715, a plurality of instances are generated by the secure area issuer in the secure domain in the secure area of the electronic device 400. In step 717, an SP or secure domain provider may personalize the instances of the secure domain. For the personalization of the instances, the SP or secure domain provider may store data in the instances generated in step 715. In this case, the data stored in the personalization of the instances may include values other than important values to be protected, so that the values may be initialized.

In step 721, the secure domain receives encrypted data from the framework. In step 723, the secure domain decrypts the encrypted data. In step 725, the decrypted data is stored in the instances. For example, the decrypted data may include a key for generating a secure channel.

In step 731, the electronic device 400 receives a request to generate a secure channel from an external device (e.g., a device providing an access service such as a door lock).

In step 733, the electronic device 400 performs mutual authentication with an external device, based on the key stored in the instances of the secure area. The electronic device 400 may generate a secure channel by performing mutual authentication by exchanging an application protocol data unit (APDU) with an external device by using a Bluetooth™ communication method.

In step 735, the electronic device 400 generates a session key. In step 736, the electronic device 400 generates a UWB session key. In step 741, a UWB communication module of the electronic device 400 generates an STS code. In step 743, the UWB communication module performs security ranging using the STS code.

Figure 8:
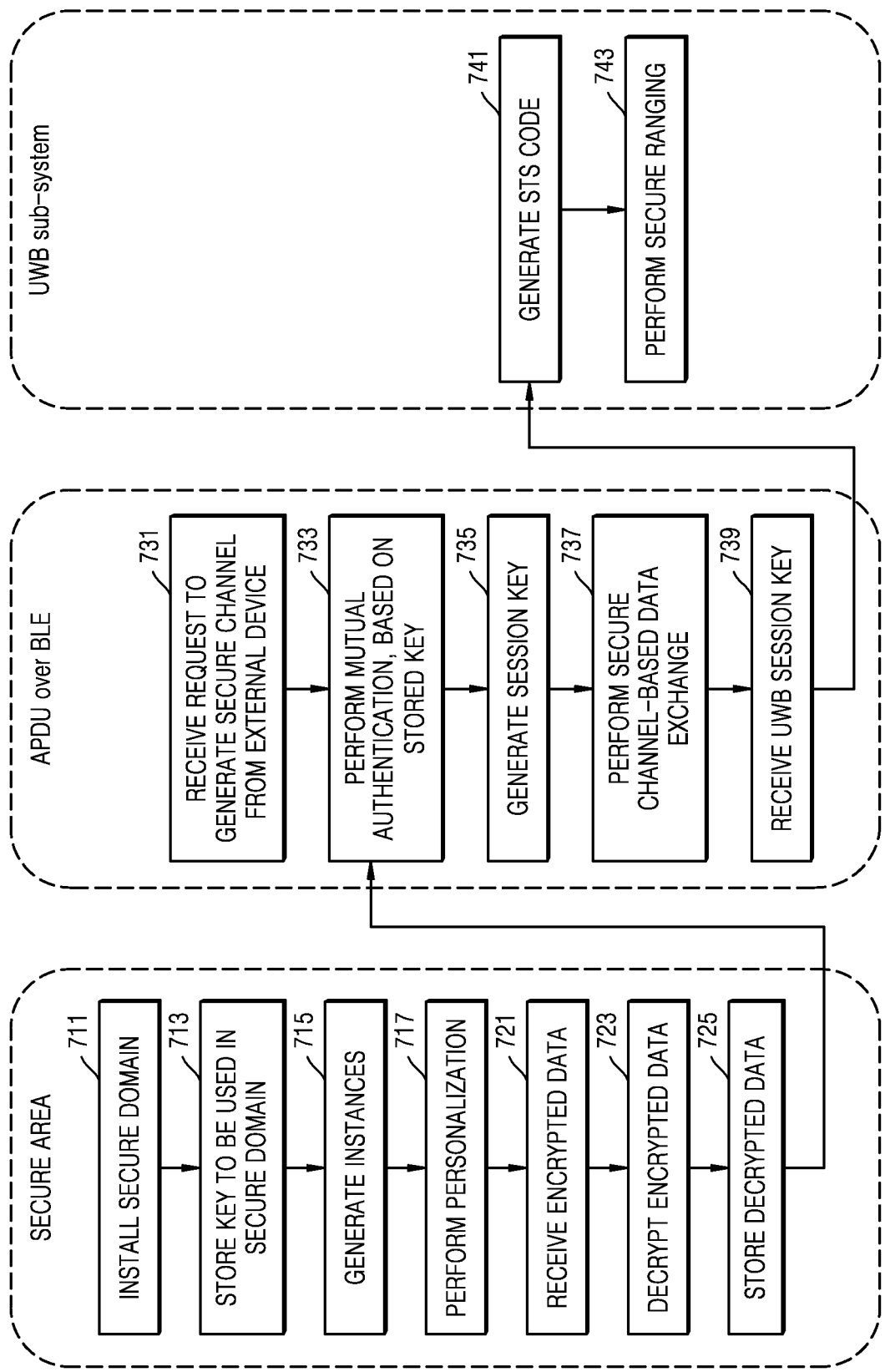
FIG. 8 is a detailed flowchart of an operation method of an electronic device, according to another embodiment.

FIG. 8 is a detailed flowchart of an operation method of an electronic device, according to an embodiment.

Steps 711 to 735 of FIG. 8 are the same as steps 711 to 735 of FIG. 7 and thus a redundant description thereof will be omitted. Unlike the embodiment of FIG. 7, according to the embodiment of FIG. 8, the electronic device 400 may receive a UWB session key from an external device without directly generating the UWB session key.

In step 737, the electronic device 400 performs secure channel-based data exchange using the session key. In step 739, the electronic device 400 receives a UWB session key from an external device. In this case, the received UWB session key may be generated based on an exchanged session key. In step 741, a UWB communication module of the electronic device 400 generates an STS code. In step 743, the UWB communication module performs security ranging using the generated STS code.

Figure 9:
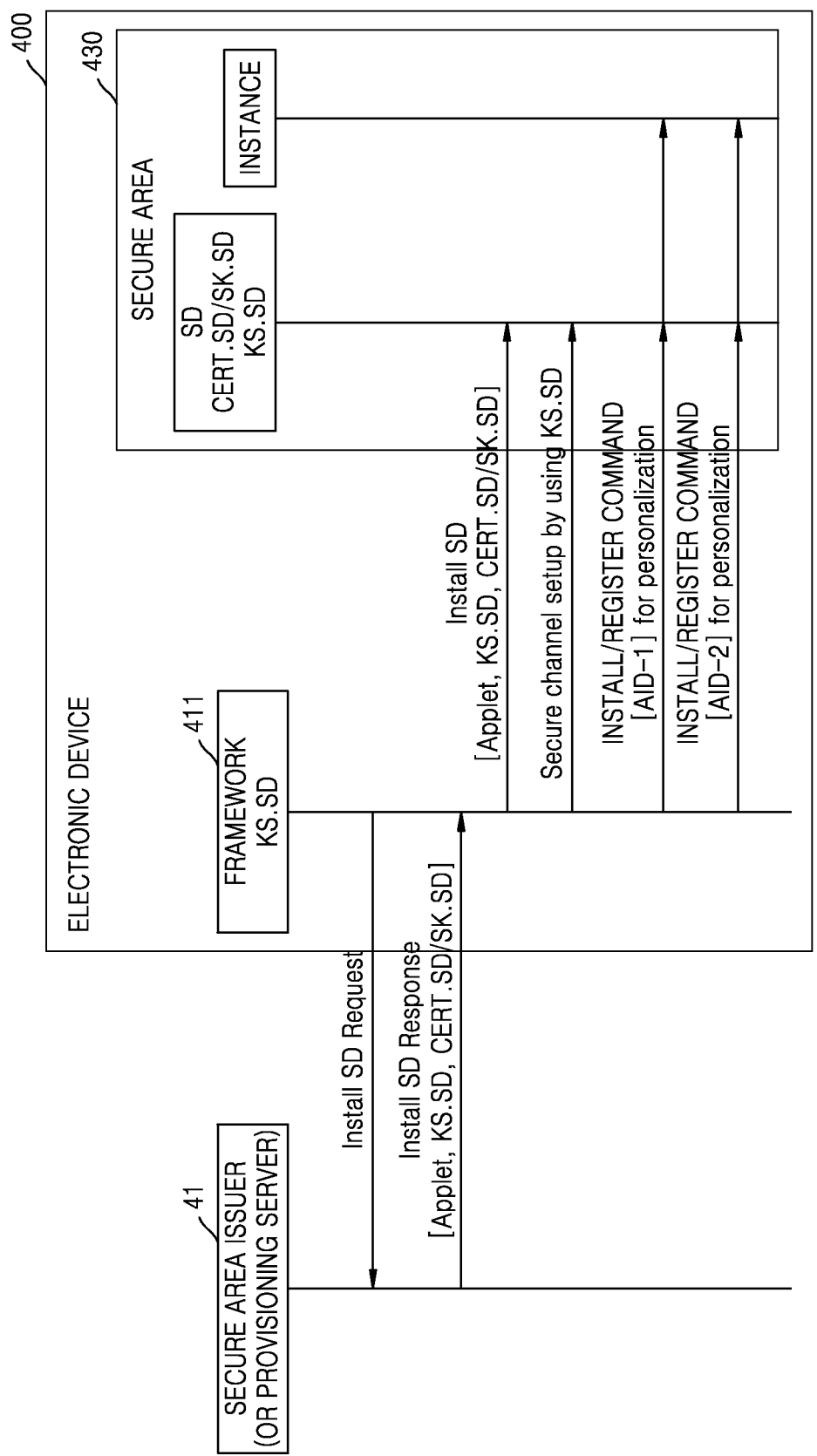
FIG. 9 is a flowchart of a method of generating an instance by a key management system, according to an embodiment.

FIG. 9 is a flowchart of a method of generating an instance by a key management system, according to an embodiment.

Referring to FIG. 9, a framework 411 of an electronic device 400 requests a secure area issuer 41 to install a secure domain. The secure area issuer 41 is a highest authority subject having an authority to install a secure domain and may be in charge of all operations of a secure area. For example, the secure area issuer 41 may be embodied as a service providing server or a backend server, which provides a certain service. The secure area issuer 41 transmits a code (applet) and major key values which are related to installing a secure domain to the framework. The main key values transmitted to the framework may include, for example, a symmetric key KS.SD of the secure domain, a certificate CERT.SD of the secure domain, and a private key SK.SD of the secure domain.

The framework 411 may install the secure domain in the secure area, based on the values received from the secure area issuer 41, and may install the applet and the major key values. The framework 411 may prepare to perform secure communication with the secure domain by setting up a secure channel using the symmetric key KS.SD of the secure domain received from the secure domain issuer 41. The framework 411 may generate an instance in the secure domain by using the symmetric key KS.SD of the secure domain. To generate an instance in the secure domain, the framework 411 repeatedly may transmit a command INSTALL/REGISTER to the secure domain as needed, based on the symmetric key KS.SD of the secure domain.

Figure 10:
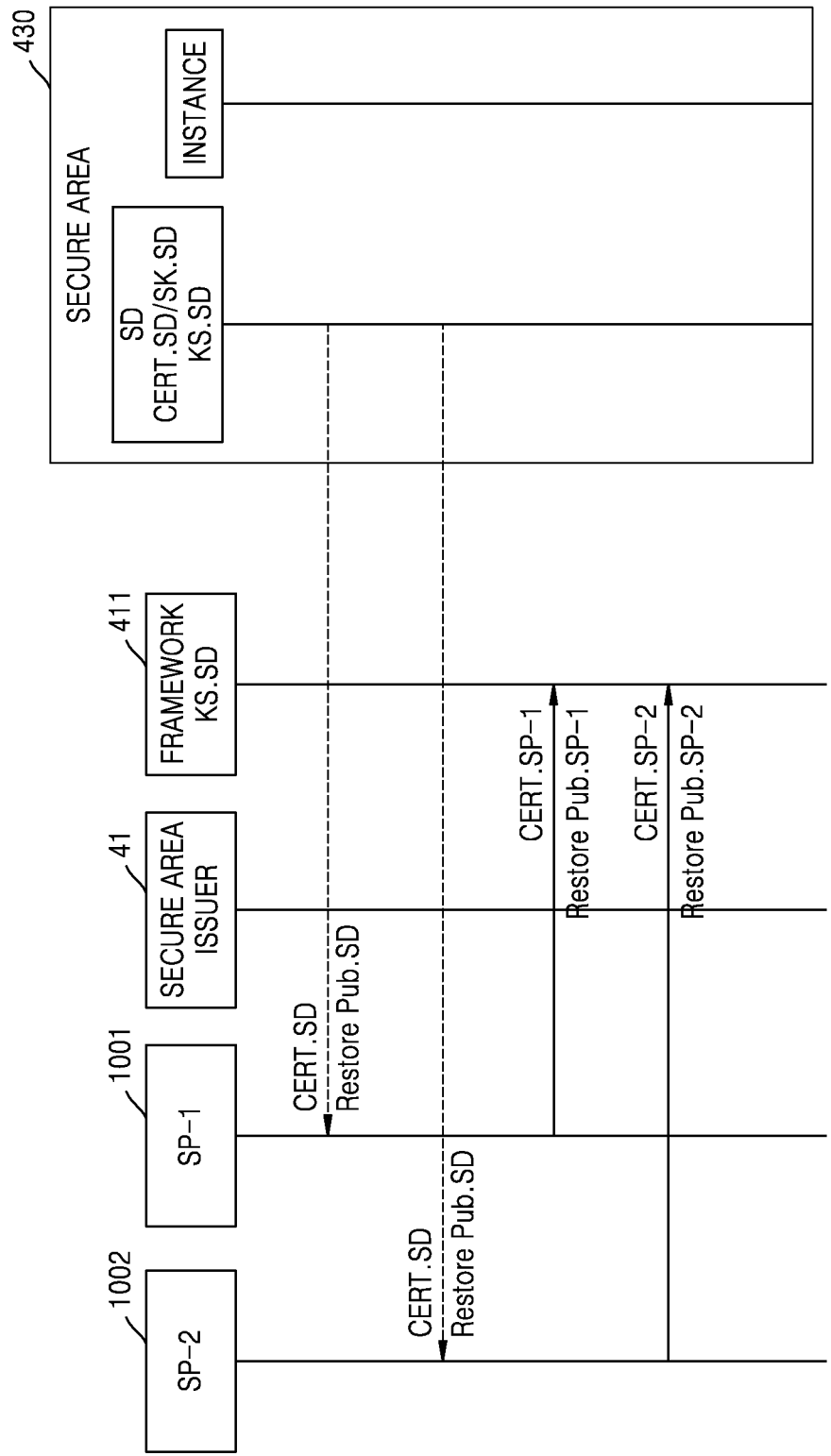
FIG. 10 is a flowchart of a method of managing content stored in an instance, the method being performed by a key management system, according to an embodiment.

FIG. 10 is a flowchart of a method of managing content stored in an instance, the method being performed by a key management system, according to an embodiment.

Referring to FIG. 10, a secure domain may transmit a certificate CERT.SD of a secure domain to first and second SPs 1001 and 1002. The certificate CERT.SD of the secure domain may include a public key Pub.SD of the secure domain. The first and second SPs 1001 and 1002 may store the public key Pub.SD of the secure domain.

The first SP 1001 may transmit a certificate CERT.SP-1 thereof to the framework 411, and the framework 411 may store a public key Pub.SP-1 of the first SP 1001, which is included in the certificate CERT.SP-1, Similarly, the second SP 1002 may transmit a certificate CERT.SP-2 thereof to the framework 411, and the framework 411 may store a public key Pub.SP-2 of the second SP 1002, which is included in the certificate CERT.SP-2.

As illustrated in FIG. 10, a trusted boundary may be configured in advance through exchange of certificates of s secure domain and an SP. Accordingly, the secure domain and the SP may trust secure communication to be established later when the secure communication is a value based on the exchanged certificates.

Figure 11:
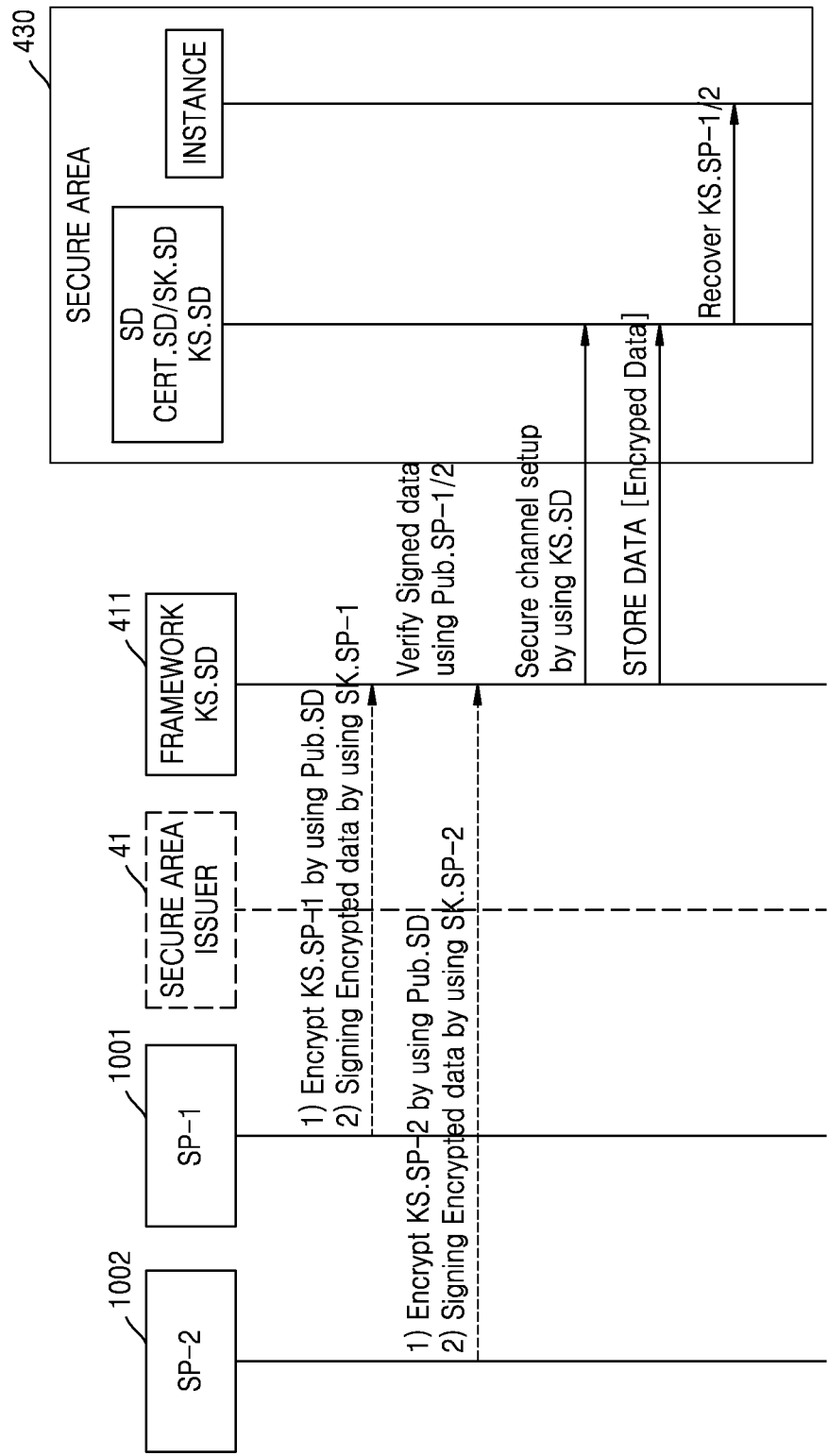
FIG. 11 is a flowchart of a method of managing content stored in an instance, the method being performed by a key management system, according to an embodiment.

FIG. 11 is a flowchart of a method of managing content stored in an instance, the method being performed by a key management system, according to an embodiment.

An SP may transmit a key to an instance, based on a certificate exchanged in the process illustrated in FIG. 10.

Referring to FIG. 11, a first SP 1001 may encrypt a first SP key KS.SP-1 by using a public key Pub.SD of a secure domain, and sign encrypted data by using a private key SK.SP-1 of the first SP 1001. The first SP 1001 may transmit the signed data to a framework 411. The framework 411 may authenticate first signed data, which is received from the first SP 1001, by using a previously stored public key Pub.SP-1 of the first SP 1001. The framework 411 may obtain first encrypted data from the authenticated first signed data.

A second SP 1002 may encrypt a second SP key KS.SP-2 by using the public key Pub.SD of the secure domain and sign encrypted data by using a private key SK.SP-2 of the second SP 1002. The second SP 1002 may transmit the signed data to the framework 411. The framework 411 may authenticate second signed data, which is received from the second SP 1002, by using a previously stored public key Pub.SP-2 of the second SP 1002. The framework 411 may obtain second encrypted data from the authenticated second signed data.

The framework 411 may transmit encrypted data obtained from signed data through a secure channel set up using a symmetric key KS.SD of the secure domain. The secure domain may decrypt the encrypted data by using the private key SK.SD of the secure domain. The secure domain may obtain a symmetric key KS.SP-1 of the first SP 1001 from the first encrypted data by decrypting the first encrypted data. The secure domain may obtain a symmetric key KS.SP-2 of the second SP 1002 from the second encrypted data by decrypting the second encrypted data.

The secure domain may store a decrypted key in a corresponding instance. For example, the symmetric key KS.SP-1 of the first SP 1001 may be stored in a first instance allocated to the first SP 1001. The symmetric key KS.SP-2 of the second SP 1002 may be stored in a second instance allocated to the second SP 1002.

Figure 12:
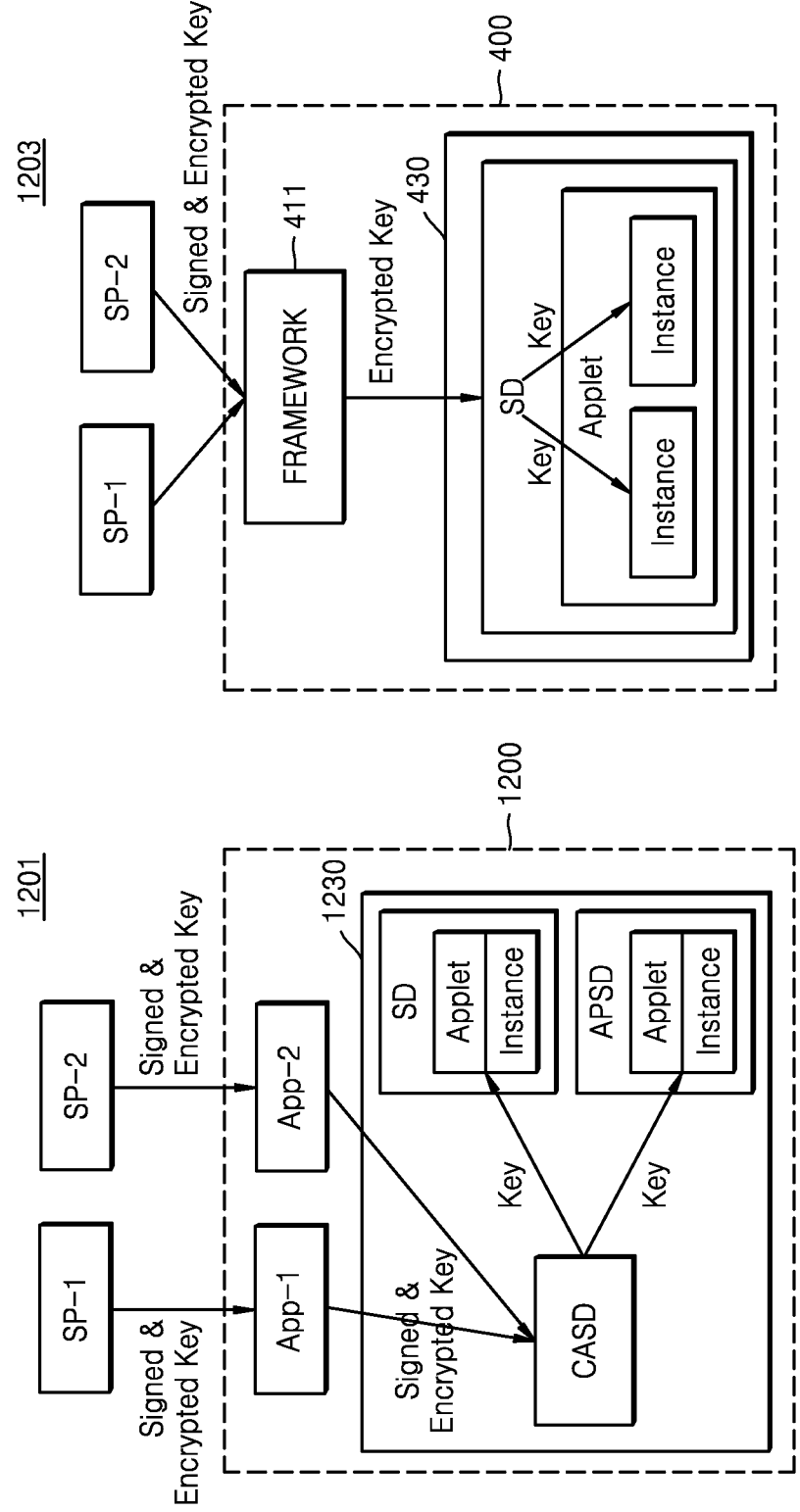
FIG. 12 is a diagram for explaining the difference between a general key management method using a controlling authority secure domain (CASD) and a key management method, according to an embodiment.

FIG. 12 is a diagram for explaining the difference between a key management method of a general device 1200 using a CASD and a key management method of a device 400, according to an embodiment.

Referring to FIG. 12, in block diagram 1201, a CASD in a secure area 1230 decrypts data received from SPs and transmits decrypted values (e.g., key values) to applets. The applets store the decrypted values. Therefore, because the CASD should be capable of reading all encrypted values, all SPs should trust the CASD and the method of the block 1201 is not efficient.

In contrast, according to a newly proposed method performed by the device 400 shown in a block diagram 1203 of FIG. 12, one framework may manage keys stored in a plurality of instances in a secure area 430 in an integrated manner, thereby improving compatibility. In addition, a key individually managed by an SP may be encrypted and transmitted to a secure domain and stored in a separate secure area, thereby improving security.

Figure 13:
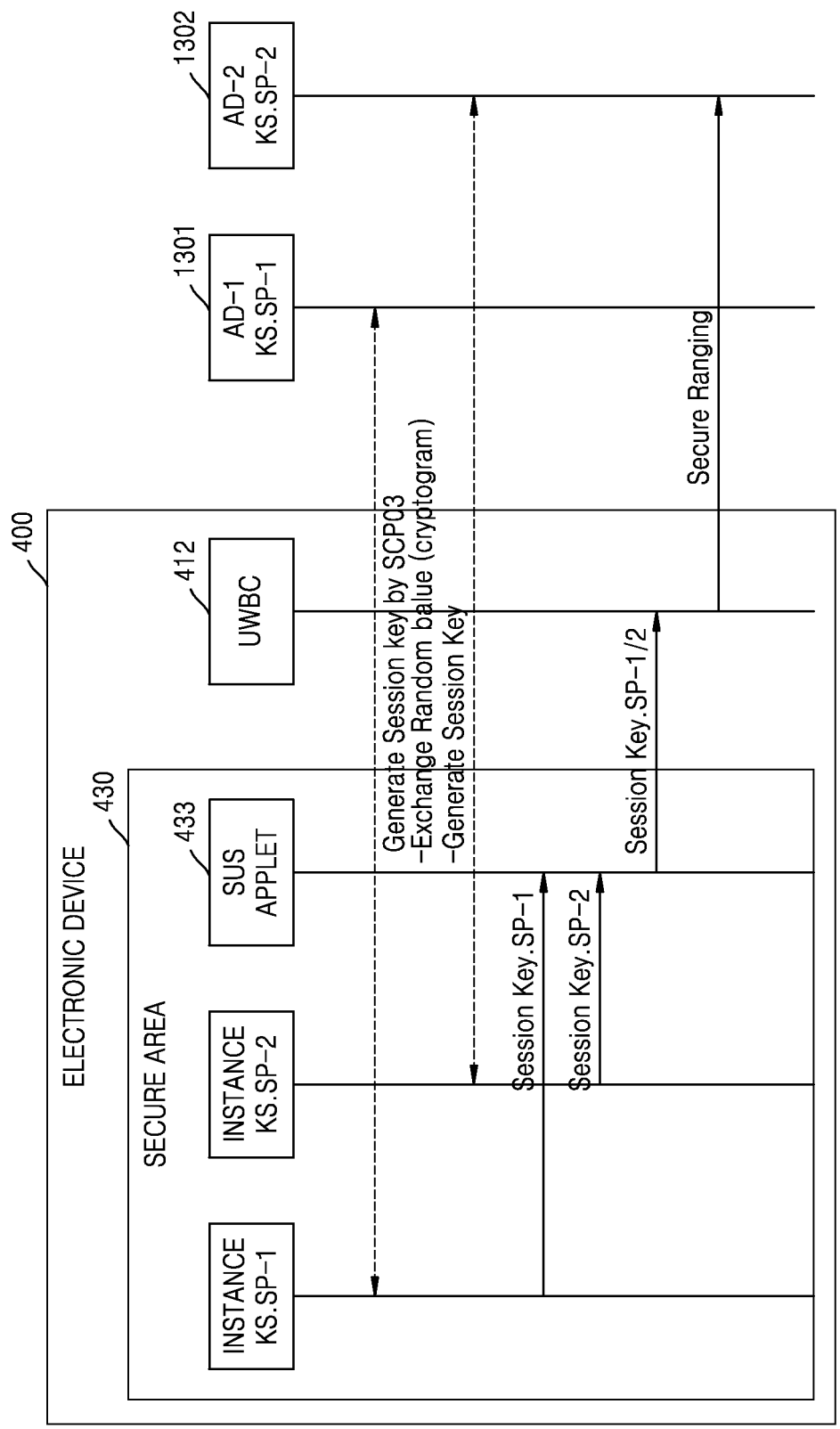
FIG. 13 is a flowchart of a method of performing secure ranging by a key management system, according to an embodiment.

FIG. 13 is a flowchart of a method of performing secure ranging by a key management system, according to an embodiment.

Referring to FIG. 13, the electronic device 400 may generate a session key to perform security ranging with first and second devices 1301 and 1302 which provide an access control service.

The first device 1301, which provides an access control service related to a first SP and stores a key KS.SP-1 related to the first SP, may request a first instance storing the key KS.SP-1 provided from the first SP to generate a secure channel. The first instance may perform mutual authentication with the first device 1301, based on the stored key KS.SP-1, and generate a session key. The first instance may exchange a random value (e.g., a cryptogram) with the first device 1301 and generate a session key. SP-1 based on the stored key KS.SP-1 and the random value. For example, the first instance and the first device 1301 may generate a session key through a security protocol SCP03.

A session key generated for each session may be used as a value to be input to generate a UWB session key. The first instance may transmit the session key SP-1 to an SUS applet 433 and the SUS applet 433 may transmit the session key SP-1 to a UWB communication module 415 (e.g., a UWB chipset (UWBC)). The UWB communication module 415 may configure a UWB session key based on the session key SP-1. Alternatively, the first instance may generate a UWB session key based on the session key SP-1 and transmit the UWB session key to the UWB communication module 415. The UWB communication module 415 may generate an STS code based on the UWB session key. The UWB communication module 415 may implement secure ranging by transmitting or receiving a ranging frame including the STS code.

A secure channel between the second device 1302 and a second instance may be generated in the same manner as described above, and UWB security ranging may be performed based on the secure channel. For example, the second device 1302, which provides an access control service related to a second SP and stores a key KS.SP-2 related to the second SP, may request the second instance storing a key KS.SP-2 provided from the second SP to generate a secure channel. The second instance may perform mutual authentication with the second device 1302 and generate a session key, based on the stored key KS.SP-2. The second instance may exchange a random value (e.g., a cryptogram) with the second device 1302, and generate a session key SP-2 based on the stored key KS.SP-2 and the random value.

Figure 14:
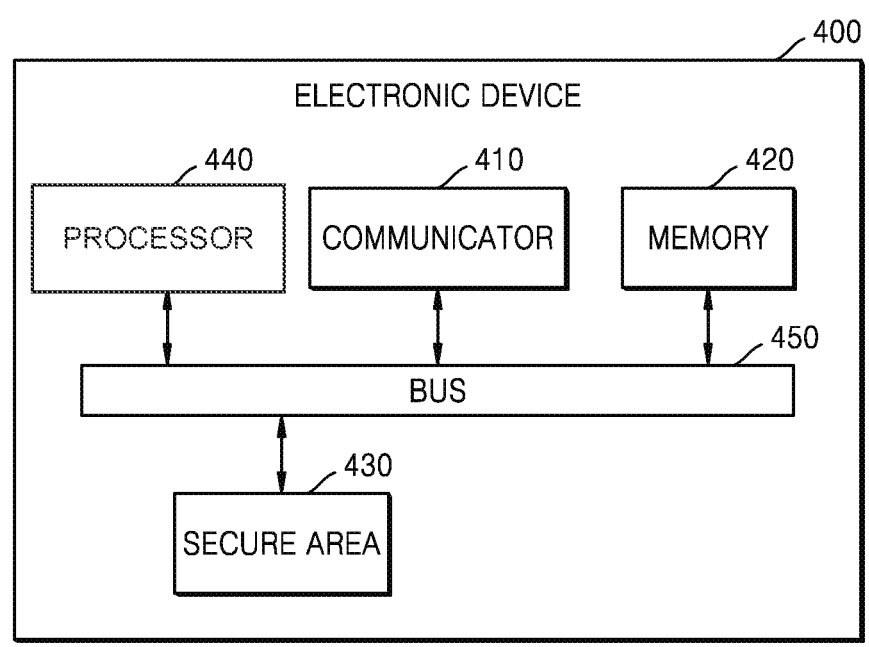
FIG. 14 is a block diagram of an electronic device, according to an embodiment.

FIG. 14 is a diagram illustrating a configuration of an electronic device 400 that manages a plurality of keys, according to an embodiment.

The electronic device 400 may include a personalized mobile device, but is not limited thereto and may include various types of electronic devices. For example, the electronic device 400 may include a smart phone, a tablet PC, a PC, a camera, and a wearable device Referring to FIG. 14, the electronic device 400 includes a communicator 410, a memory 420, a secure area 430, a processor 440, and a bus 450 connecting these components.

The communicator 410 may perform wired or wireless communication with another device or a network. To this end, the communicator 410 may include a communication module supporting at least one of various wired and wireless communication methods. The communication module may be in the form of a chipset or may be a sticker/barcode (e.g. a sticker with an NFC tag) storing information necessary for communication.

The wireless communication may include at least one of cellular communication, Wi-Fi, Wi-Fi Direct, Bluetooth, UWB, or NFC. The wired communication may include at least one of universal serial bus (USB) or high-definition multimedia interface (HDMI).

The communicator 410 may include a communication module for short-range communication. The communication module may establish various short-range communications such as infrared communication and magnetic secure transmission (MST) communication, as well as Wi-Fi, Wi-Fi Direct, Bluetooth, and NFC described above.

Various types of data such as programs (e.g., an application) and files may be installed and stored in the memory 420. The processor 440 may access and use the data stored in the memory 420 or store new data in the memory 420. A program (e.g., a framework) and data for digital key management may be installed and stored in the memory 420.

The memory 420 may include at least one type of storage medium among a flash memory type storage medium, a hard disk type storage medium, a multimedia card micro type storage medium, a card type memory (e.g., a secure digital (SD) memory or an extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disc.

The electronic device 400 may include a secure area, and the secure area may perform processes, such as generating, deleting, and managing a digital key for controlling or accessing an external device, and authenticating the digital key. Furthermore, the secure domain may provide a function of securely managing a digital key by authenticating an external entity (e.g., a service providing server) which accesses the digital key and verifying authority of the external entity. The secure area may include an SE and/or a TEE.

The secure area 430 is an independent and secure storage device of the electronic device 400 and is accessible only by authenticated applications. The secure area 430 may be configured to be physically isolated from other hardware components. Programs and data (e.g., secure domains and applets) for managing digital keys may be installed and stored in the secure area 430.

The processor 440 may control overall operations of the electronic device 400 and may include at least one processor such as a central processing unit (CPU) or a graphics processing unit (GPU). The processor 440 may control the other components included in the electronic device 400 to perform operations for digital key management. The processor 440 may execute programs stored in the memory 420 and the secure area 430, read a stored file, or store a new file.

The processor 440 may receive a request to process a digital key from an external device or application by using a framework, and transmit the request and authentication information stored in the framework to a secure domain of the secure area and/or an instance. The processor 440 may process the digital key by using an applet executed in the secure area 430 based on the request to process the digital key, the authentication information received from the framework, and authentication information stored in the secure area 430. Here, the processing of the digital key may include at least one operation of generating, deleting, or managing the digital key.

The processor 440 may generate a secure domain in the secure area 430, based on information received from a secure area issuer by using the framework. The processor 440 may generate a plurality of instances by instantiating the secure domain. The processor 440 may generate a plurality of instances corresponding to a plurality of SPs.

The secure area 430 may transmit a certificate of the secure domain to a plurality of SPs. The certificate of the secure domain may include a public key of the secure domain.

The processor 440 may receive a certificate of each of the plurality of SPs from the plurality of SPs by using the framework installed in the electronic device 400. The certificate of each of the plurality of SPs may include a public key of each of the plurality of SPs.

The processor 440 may receive first signed data from a first SP among the plurality of SPs by using the framework and authenticate the first signed data by using a first SP certificate received from the first SP. The first signed data received from the first SP may include a first SP key, which is encrypted using the public key of the secure domain, and a signature using a private key of the first SP.

The processor 440 may obtain the encrypted first SP key from the authenticated first signed data and transmit the encrypted first SP key to the secure domain of the secure area 430 by using the framework.

The secure domain of the secure domain 430 may decrypt an encrypted key by using a private key of the secure domain and store the decrypted key in a secure area allocated to one of a plurality of instances of the secure domain.

The secure domain of the secure domain 430 may decrypt the encrypted first SP key by using the private key of the secure domain, and store the decrypted first SP key in a secure area allocated to a first instance corresponding to the first SP among the plurality of the secure domain.

The processor 440 may further receive second signed data from a second SP among a plurality of SPs by using the framework, and authenticate the second signed data by using a second SP certificate received from the second SP. The second signed data received from the second SP may include a second SP key, which is encrypted using the public key of the secure domain, and a signature using a private key of the second SP.

The processor 440 may obtain the encrypted second SP key from the authenticated second signed data and transmit the encrypted second SP key to the secure domain of the secure area 430 by using the framework.

The secure domain of the secure area 430 may decrypt the encrypted second SP key by using the private key of the secure domain, and store the decrypted second SP key in a second instance corresponding to the second SP among the plurality of instances of the secure domain.

The secure domain of the secure area 430 may perform mutual authentication with a first device, which provides an access service related to the first SP by using the first SP key stored in the first instance, and set up a secure channel. The electronic device 400 and the first device may set up a secure channel by using a Bluetooth™ communication method.

The electronic device 400 may use a session key as an input value for generating a UWB session key. For example, the electronic device 400 may directly generate the UWB session key by using the session key generated using the first SP key. Additionally or alternatively, the electronic device 400 may receive and use a UWB session key generated by the first device, based on a session key generated using the first SP key.

A UWB communication module of the communicator 410 of the electronic device 400 may perform ranging with the first device by transmitting or receiving a ranging frame including an STS code generated the UWB session key.

The bus 450 is a common data transmission path connecting the communicator 410, the memory 420, the secure area 430, and the processor 440.

Figure 15:
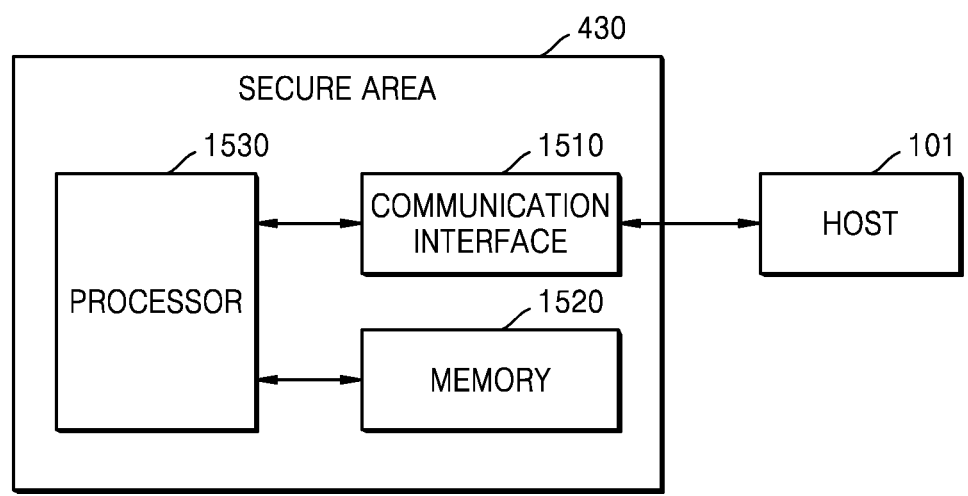
FIG. 15 is a block diagram of a secure area, according to an embodiment.

FIG. 15 is a block diagram of a secure area 430 according to an embodiment.

Referring to FIG. 15, the secure area 430 includes a communication interface 1510, a memory 1520, and a processor 1530.

The secure area 430 is an independent and secure storage device of the electronic device 400 and is accessible only by authenticated applications. The secure area 430 may include a TEE, an eSE, a universal integrated circuit card (UICC), an SD card, an embedded UICC (eUICC), and a separate security processing unit (SPU) that is a combination of hardware and software or that employs a hardware method.

The communication interface 1510 may communicate with a host 101. The communication interface 1510 may include at least one of various wired/wireless communication interfaces for communicating with the host 101. Here, the host 101 may be one of devices included in the electronic device 400, and may include an application processor (AP) and a memory. The communication interface 1510 may be a serial interface such as International Organization for Standardization (ISO) 7816, a USB, an inter-integrated circuit (I²C), a serial peripheral interface (SPI), a single wire protocol (SWP), or a serial interface generally used for communication between two hardware devices. Alternatively, the communication interface 1510 may be a wireless interface, such as ISO 14443, ZigBee™ or Bluetooth™, which directly connects an antenna to a hardware device. Furthermore, the communication interface 1510 may be a parallel interface connected to a central bus BUS of the electronic device 400, and may include a buffer to receive commands and data from the host 101.

Various types of data such as programs (e.g., an application) and files may be installed and stored in the memory 1520. The processor 1530 may access and use the data stored in the memory 1520 or store new data in the memory 1520. A program and data for processing a digital key may be installed and stored in the memory 1520. The memory 1520 may be a nonvolatile memory device.

The processor 1530 may control overall operations of the secure area 430 and may include at least one processor such as a CPU or a GPU. The processor 1530 may control other components included in the secure area 430 to perform an operation for processing a digital key. For example, the processor 1530 may execute a program stored in the memory 1520, read a stored file from the memory 1520, or store a new file in the memory 1520. The processor 1530 may execute a program stored in the memory 1520 to perform an operation for processing a digital key.

The electronic device 400 including the secure area 430 may further include a framework. The framework is a service application functioning as a gateway when the secure area 430 is accessed by an external entity. The framework may provide an API accessible by an external entity and provide functions such as access control and command conversion to access the secure area 430. The external entity may be a secure area issuer, an SP and/or an access service providing device.

A lightweight application (e.g., an applet or a TA) may be installed and driven in the secure area 430. The applet may store a digital key in the secure area 430 and provide services such as using, deleting, and managing the stored key. The applet may be mounted in advance in the secure area 430 or loaded or installed therein later as needed.

Figure 16:
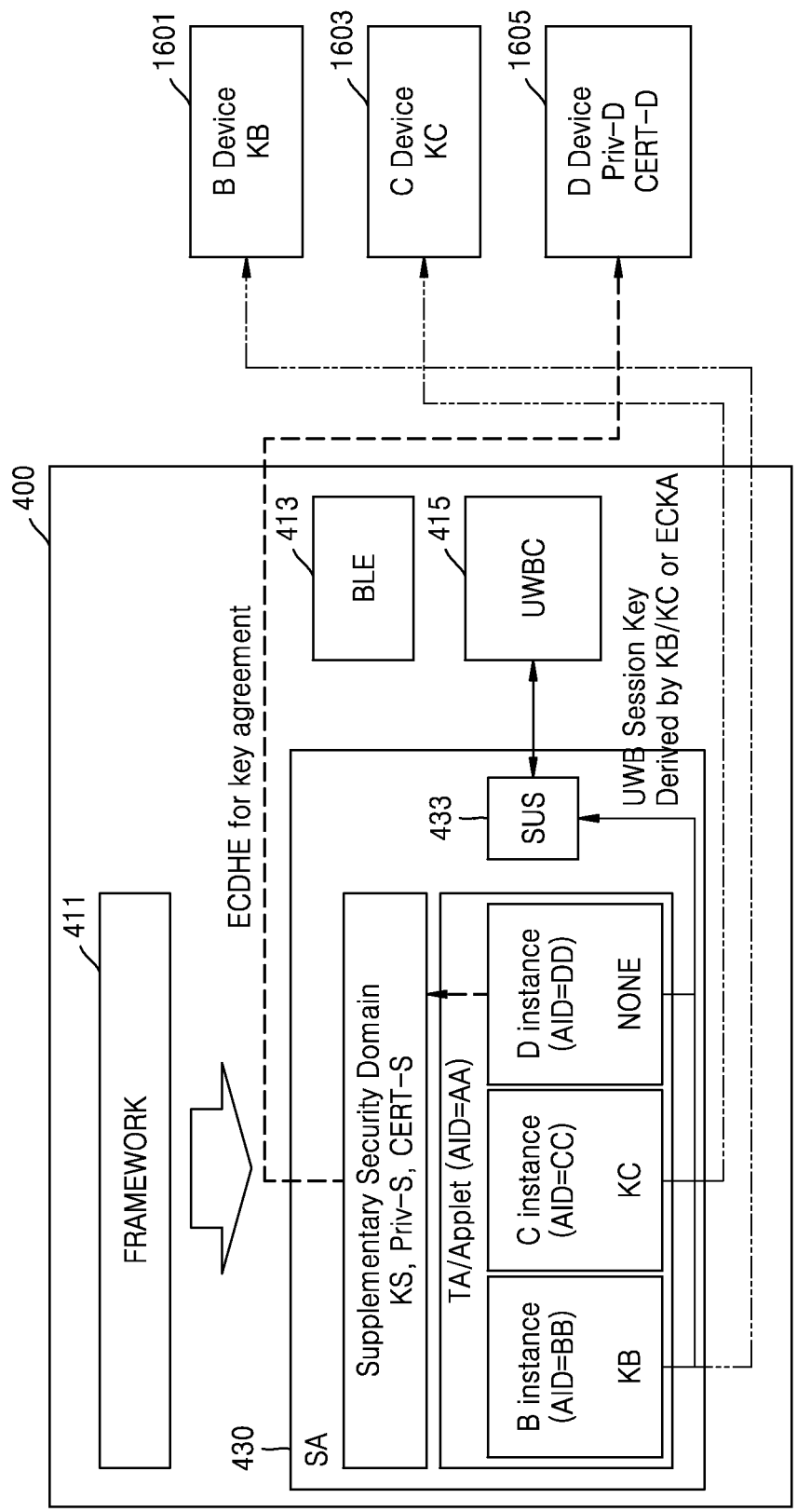
FIG. 16 is a diagram for explaining operations of an electronic device, according to an embodiment.

FIG. 16 is a diagram for explaining operations of an electronic device, according to an embodiment.

As illustrated in FIG. 16, the electronic device 400 may generate instances, based on the same applet or TA in a secure area 430, and store each of encryption keys for secure communication in one of the instances. An instance B stores a key KB related to an access service provided by a device B 1601, and an instance C stores a key KC related to an access service provided by a device C 1603.

In the diagram of FIG. 16, AID is an identifier representing an applet and may be used to call the applet (or instance) and/or a TA. For example, an identifier of a common applet is AA, an identifier of the instance B is BB, an identifier of the instance C is CC, and an identifier of the instance D is DD.

The electronic device 400 may transmit a session key generated using a key stored in each instance to one of external devices 1601 and 1603 by using a Bluetooth™ communication module 413. In addition, the electronic device 400 may derive a UWB session key from the session key and use the UWB session key to perform UWB secure ranging with one of the external devices 1601 and 1603.

The instance B may perform mutual authentication with the device B 1601 by using the stored key KB. The instance B may generate a session key by using the stored key KB, and transmit the session key to the device B 1601 by using a Bluetooth™ communication module 413. The instance B may derive a UWB session key from the session key or may receive a UWB session key from the device B 1601. The instance B may transmit the UWB session key to a UWB communication module 415, and the UWB communication module 415 may perform secure ranging with the device B 1601 by using the UWB session key.

The instance C may similarly perform mutual authentication with the device C 1603 by using the stored key KC. The instance C may generate a session key by using the stored key KC, and transmit the session key to the device C 1603 by using the Bluetooth™ communication module 413. The instance C may derive a UWB session key from the session key or may receive a UWB session key from the device C 1603. The instance C may transmit the USB session key to the UWB communication module 415, and the UWB communication module 415 may perform secure ranging with the device C 1603 by using the UWB session key.

The electronic device 400 may perform security authentication and encryption using a key of a secure domain when there is no key stored in an instance.

Because an instance D communicating with a device D 1605 does not store a key, a key Priv-S, CERT-S of the secure domain may be used. The instance D may perform mutual authentication with the device D 1605 by using the key Priv-S, CERT-S of the secure domain and generate a session key. The instance D may derive a UWB session key from the session key or may receive a UWB session key from the device D 1605. The instance D may transmit the UWB session key to the UWB communication module 415, and the UWB communication module 415 may perform secure ranging with the device D 1605 by using the UWB session key.

The embodiments of the disclosure set forth herein may be implemented as a software program including instructions stored in a computer-readable storage medium.

The computer refers to a device capable of calling an instruction stored in a storage medium and operating according to the called instruction according to the embodiments of the disclosure set forth herein, and may include an image transmission device and an image receiving device.

The computer-readable storage medium may be provided as a non-transitory storage medium. Here, the term "non-transitory" means that the storage medium does not include a signal and is tangible but does not indicate whether data is stored in the storage medium semi-permanently or temporarily. For example, the "non-transitory storage medium" may include a buffer in which data is temporarily stored.

Electronic devices or methods according to the embodiments set forth herein may be provided by being included in a computer program product. A computer program product may be traded as a product between a seller and a purchaser.

The computer program product may include a software program and a computer-readable storage medium storing the software program. The computer program product may include a product (e.g., a downloadable application) in the form of a software program distributed electronically by the manufacturer of an electronic device or through an electronic market (e.g., Google Play Store™ or App Store™). For electronic distribution of the computer program product, at least part of the software program may be stored in a storage medium or temporarily generated. In this case, the storage medium may be a storage medium of a server of the manufacturer, a server of the electronic market, or a storage medium of a relay server that temporarily stores the software program.

The computer program product may include a storage medium of a server or a storage medium of a UE in a system that includes the server and the UE. Alternatively, when there is a third device (e.g., a smart phone) capable of establishing communication with the server or the UE, the computer program product may include a storage medium of the third device. Alternatively, the computer program product may include a software program transmitted from the server to the UE or the third device, or transmitted from the third device to the UE.

In this case, the server, the UE, or the third device may execute the computer program product to perform the methods according to the embodiments of the disclosure set forth herein. Alternatively, two or more among the server, the UE, and the third device may execute the computer program product to perform the methods according to the embodiments of the disclosure set forth herein in a distributed manner.

For example, the server (e.g., a cloud server or an artificial intelligence server) may execute the computer program product stored in the server to control the UE connected thereto through communication to perform the methods according to the embodiments of the disclosure set forth herein.

Additionally or alternatively, the third device may execute the computer program product to control the UE connected thereto to perform the methods according to the embodiments of the disclosure set forth herein.

When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method, performed by a first electronic device, the method comprising:
   creating a plurality of instances in a common applet,
   wherein the plurality of instances corresponds to a plurality of service providers (SPs) and includes one or more keysets of the plurality of SPs, and wherein the common applet is installed in a secure area for digital key management;
   storing data for a secure channel to a first instance, which is one of the plurality of instances, the first instance being used by a first SP, which is one of the plurality of SPs; and
   generating an ultra wide band (UWB) session key for a second electronic device based on the stored data;
   generating a scrambled timestamp sequence (STS) based on the UWB session key; and
   performing secure ranging using the STS.

2. The method of claim 1, further comprising:
   transmitting, to the first SP, a certificate of the secure area;
   receiving, from the first SP, a certificate of the first SP and a first signed data;
   authenticating the first signed data by using a public key of the first SP included in the certificate of the first SP and obtaining encrypted data from the first signed data;
   decrypting the encrypted data by using a private key of the secure area; and
   storing a decrypted key of the first SP in the first instance corresponding to the first SP among the plurality of instances in the secure area.

3. The method of claim 1, further comprising:
   installing a secure domain (SD) in the secure area, based on information received from a secure area issuer.

4. The method of claim 2, wherein the certificate of the secure area comprises a public key of the secure area.

5. The method of claim 2, wherein the first signed data received from the first SP comprises a key of the first SP encrypted using a public key of the secure area and signed using a private key of the first SP.

6. The method of claim 1, further comprising:
   setting up the secure channel by using a Bluetooth communication method.

7. A first electronic device comprising:
   a memory storing instructions; and
   a processor coupled with the memory and configured to execute the instructions to:
   create a plurality of instances in a common applet,
   wherein the plurality of instances corresponds to a plurality of service providers (SPs) and includes one or more keysets of the plurality of SPs, and wherein the common applet is installed in a secure area, for digital key management;
   store data for a secure channel to a first instance, which is one of the plurality of instances, the first instance being used by a first SP, which is one of the plurality of SPs;
   generate an ultra wide band (UWB) session key for a second electronic device based on the stored data;
   generate a scrambled timestamp sequence (STS) based on the UWB session key; and
   perform a secure ranging using the STS.

8. The first electronic device of claim 7, wherein the processor is further configured to execute the instructions to:
   transmit, to the first SP, a certificate of the secure area;
   receive, from the first SP, a certificate of the first SP and a first signed data;
   authenticate the first signed data by using a public key of the first SP included in the certificate of the first SP and obtaining encrypted data from the first signed data;
   decrypt the encrypted data by using a private key of the secure area; and
   store a decrypted key of the first SP in the first instance corresponding to the first SP among the plurality of instances in the secure area.

9. The first electronic device of claim 7, wherein the processor is further configured to execute the instructions to:
   install a secure domain (SD) in the secure area, based on information received from a secure area issuer.

10. The first electronic device of claim 8, wherein the certificate of the secure area comprises a public key of the secure area.

11. The first electronic device of claim 8, wherein the first signed data received from the first SP comprises a key of the first SP encrypted using a public key of the secure area; and signed using a private key of the first SP.

12. A non-transitory computer-readable recording medium storing a program, when executed, performs a method, the method comprising:
   creating a plurality of instances in a common applet, wherein the plurality of instances corresponds to a plurality of service providers (SPs) and includes one or more keysets of the plurality of SPs, and wherein the common applet is installed in a secure area for digital key management;
   storing data for a secure channel to a first instance, which is one of the plurality of instances, the first instance being used by a first SP, which is one of the plurality of SPs;
   generating an ultra wide band (UWB) session key for a second electronic device based on the stored data;
   generating a scrambled timestamp sequence (STS) based on the UWB session key; and
   performing a secure ranging using the STS.

* * * * *